United States Patent
Bhat et al.

(10) Patent No.: US 9,031,124 B1
(45) Date of Patent: May 12, 2015

(54) SCHEME FOR GENERATING HYPOTHESIS AND ESTIMATING A CARRIER FREQUENCY OFFSET IN A RECEIVER

(71) Applicant: Saankhya Labs Private Limited, Bangalore (IN)

(72) Inventors: Shrinivas Bhat, Bangalore (IN); Niranjan Mylarappa Gowda, Mysore (IN)

( * ) Notice: Subject to any disclaimer, the term of this patent is extended or adjusted under 35 U.S.C. 154(b) by 0 days.

(21) Appl. No.: 14/185,933

(22) Filed: Feb. 21, 2014

(51) Int. Cl.
*H03H 7/30* (2006.01)
*H04L 27/01* (2006.01)
*H04L 25/03* (2006.01)

(52) U.S. Cl.
CPC .......... *H04L 27/01* (2013.01); *H04L 25/03159* (2013.01)

(58) Field of Classification Search
CPC ................... H04L 25/03038; H04L 25/03057; H04L 2025/03617; H04L 2025/03477; H03H 21/0012
USPC .................................. 375/232, 231, 230, 229
See application file for complete search history.

(56) References Cited

U.S. PATENT DOCUMENTS

2009/0060101 A1* 3/2009 Liu ................................ 375/344
2010/0034300 A1* 2/2010 Xiang et al. ................... 375/260

* cited by examiner

*Primary Examiner* — Zewdu Kassa
(74) *Attorney, Agent, or Firm* — The Law Office of Austin Bonderer, PC

(57) ABSTRACT

A method of generating a hypothesis and estimating a CFO includes receiving a signal including a set of radio frames, dividing each received radio frame of the set into a set of received sub-sequences, dividing, each of reference radio frames from a reference signal stored in the receiver into a set of reference sub-sequences, correlating the set of received sub-sequences with the set of reference sub-sequences to obtain a set of correlation values, generating, a first value set and a second value set of hypothesis based on the correlation values, generating a first and a second hypothesis based on the first value and the second value set, and averaging the first and the second hypothesis to obtain an averaged hypothesis, performing a DFT on the averaged hypothesis to obtain a DFT sequence, determining a peak position of the DFT sequence, and estimating the CFO based on the peak position.

18 Claims, 15 Drawing Sheets

| PARAMETERS | METHOD OF FIGS. 4-6C | METHOD OF FIG. 2 (PRIOR ART) | METHOD OF FIG. 3 (PRIOR ART) |
|---|---|---|---|
| NUMBER OF COMPLEX MULTIPLICATIONS | $n(N+m-1) + \frac{K}{2}\log_2 K$ | $n(N + \frac{K}{2}\log_2 K)$ | $n(N+m-1)$ |
| NUMBER OF COMPLEX ADDITIONS | $n \times N + K \log_2 K$ | $n(N-m+K(1+\log_2 K))$ | $n \times N$ |

FIG. 9

SCHEME FOR GENERATING HYPOTHESIS AND ESTIMATING A CARRIER FREQUENCY OFFSET IN A RECEIVER

BACKGROUND

1. Technical Field

The embodiments herein generally relate to CFO estimation in receivers, and, more particularly, to scheme for generating hypothesis and estimating a carrier frequency in a receiver based on the hypothesis.

2. Description of the Related Art

In a wireless receiver, such as a WCDMA receiver, the inaccuracies of a local oscillator results in a frequency mismatch with that of carrier frequency of a received signal. This frequency mismatch and carrier frequency offset (CFO) degrades the performance of a receiver. This is due to usage of less expensive local oscillator in the receiver. To estimate the CFO, a radio frame from a transmission signal in a time domain is divided into equal-duration time slots. In each of the time-slot, data and/or control messages are transmitted as a sequence of symbols having a fixed length. Each time slot may be further sub-divided into two or more sub-slots.

FIG. 1 illustrates a conventional method of receiving an nth radio frame from a transmission signal and dividing the radio frame into 'm' equal-duration time slots. A sequence of length 'N' of a radio-frame (e.g., a pilot sequence) stored in a memory at the receiver end is also divided into 'm' sub-sequences of equal length and correlated with corresponding reference symbols (or two or more sub-slots) to obtain 'm' correlation values (e.g., correlation value 1, correlation value 2, upto correlation value m, etc.).

FIG. 2 illustrates a conventional method of estimating a carrier frequency offset using a Fast Fourier Transformation (FFT) technique. In step 202, a sequence that includes an nth radio frame is received as depicted in FIG. 1. The nth radio frame is illustrated in accordance with an equation:

$$\{r_n(j): j=0 \ldots N-1\} \qquad (i)$$

In step 204, each (N/m) symbol is correlated with a corresponding reference symbol to obtain 'm' correlation values which is illustrated in accordance with an equation:

$$\{a_{n,i}, i=0 \ldots m-1\} \qquad (ii)$$

In step 206, an FFT of length K is computed on $\{a_{n,i}\}$ (e.g., a first sequence) in accordance with an equation:

$$A(k) = FFT(\{a_{n,i}\}), k = 0 \ldots K-1 \qquad (iii)$$

Similarly, an FFT is computed on every sequence that is received at the receiver. In step 208, A(k) is added to hypothesis H(k), and is illustrated in accordance with an equation:

$$H(k)=H(k)+A\{k\} \qquad (iv)$$

In step 210, a peak position is determined in the hypothesis and illustrated in accordance with an equation:

$$\rho = \text{argmax } H(k), k \in (0, 1 \ldots K-1) \qquad (v)$$

In step 212, a carrier frequency is estimated from the peak position 'ρ'. As depicted in this method, the received sequence is split into multiple sub-sequences of equal, shorter lengths and correlated with the corresponding reference symbols. Hypothesis is constructed by computing DFT over this sequence of correlation values. Hypothesis averaging is done in a frequency domain by adding hypothesis of multiple radio frames (e.g., for multiple sequences) to obtain averaged hypothesis. The frequency corresponding to the peak position in the averaged hypothesis gives a CFO estimate. Since, the FFT is performed for each received sequence (or radio frame), the method results in high computational complexity.

FIG. 3 is a conventional method of estimating a carrier frequency offset using an inner slot differential combining (ISDC) technique. In step 302, a sequence that includes an nth radio frame is received as depicted in FIG. 1. The nth radio frame is depicted as the same nth radio frame in the conventional method of FIG. 2, and is illustrated in accordance with an equation:

$$\{r_n(j): j=0 \ldots N-1\} \qquad (1)$$

In step 304, each (N/m) symbol is correlated with a corresponding reference symbol to obtain 'm' correlation values which is illustrated in accordance with an equation:

$$\{a_{n,i}, i=0 \ldots m-1\} \qquad (2)$$

In step 306, a correlation values are multiplied with a complex conjugate of a previous correlation value as shown in FIG. 3. For example, if a1, a2, a3 and a4 are the correlation values, the multiplication operation is performed as: a=a2*a1, a3*a2, a4*a3. In step 308, $a_{n,i} a^*_{n,i-1}$ are added to hypothesis h in accordance with an equation:

$$h = h + (a_{n,i} a^*_{n,i-1}) \qquad (1)$$

In other words, the hypothesis is generated by multiplying (i) a2 with a complex conjugate of a1, (ii) a3 with a complex conjugate of a2, and (iii) a4 with a complex conjugate of a3. In step 308, a carrier frequency offset is estimated based on the argument of h. As depicted from the FIG. 3, ISDC technique is a low complexity CFO estimation technique. It is also depicted that the CFO estimation is performed in time domain, and hence the CFO estimated leads to a noise enhancement in the WCDMA receiver. To counter the effects of noise-enhancement, ISDC technique needs relatively a large number of averages which leads to a larger number of computations.

Additional, using an expensive local oscillator to estimate the CFO will lead to a trade-off in cost, number of components in the receiver. Thus, there is key challenge to balance the strike between quality, performance, computations, components costs, and functionality of the receiver. Accordingly there remains a need to accurately estimate a carrier frequency offset and correct it in the receiver without having to increase the computations, the cost, and at the same time balance the performance of the receiver.

SUMMARY

In view of the foregoing, an embodiment herein provides a method of generating a hypothesis for estimating a carrier frequency offset in a receiver. The method includes receiving, from a transmitter, a signal that includes a first received radio frame, and a second received radio frame, each of the first received radio frame and the second received frame includes a received sequence of length N, dividing the first received radio frame into a first received sub-sequence and a second received sub-sequence, the first received sub-sequence and the second received sub-sequence of the first received radio frame are of equal length, dividing, a first radio reference frame stored in a memory of the receiver, into a first referenced sub-sequence and a second referenced sub-sequence, the first reference sub-sequence and the second reference sub-sequence of the first radio reference frame are of equal length, correlating (i) the first received sub-sequence of the first received radio frame with the first referenced sub-sequence of the first reference radio frame, and (ii) the second received sub-sequence of the first received radio frame with the second referenced sub-sequence of the first reference radio frame to obtain a first correlation value and a second correlation value for the first received radio frame, generating, (i) a first value of hypothesis for the first received radio frame by multiplying a complex conjugate of the first correlation value of the first received radio frame with the first correlation value of the first received radio frame, and (ii) a second value of hypothesis by multiplying the complex conjugate of the first correlation value of the first received radio frame with the second correlation value of the first received radio frame, generating a first hypothesis based on the first value of hypothesis and the second value of hypothesis of the first received radio frame, dividing the second received radio frame into a first received sub-sequence, and a second received sub-sequence, the first received sub-sequence and the second received sub-sequence of the second received radio frame are of equal length, dividing, a second radio reference frame stored in a memory of the receiver, into a first referenced sub-sequence, and a second referenced sub-sequence, the first reference sub-sequence and the second reference sub-sequence of the second radio reference frame are of equal length, correlating (i) the first received sub-sequence of the second received radio frame with the first referenced sub-sequence of the second referenced radio frame, and (ii) the second received sub-sequence of the second received radio frame with the second referenced sub-sequence of the second referenced radio frame to obtain a first correlation value and a second correlation value for the second received radio frame, generating (i) a first value of hypothesis for the second received radio frame by multiplying a complex conjugate of the first correlation value of the second received radio frame with the first correlation value of the second received radio frame, and (ii) a second value of hypothesis for the second received radio frame by multiplying a complex conjugate of the first correlation value of the second received radio frame with the second correlation value of the second received radio frame, and generating a second hypothesis based on the first value of hypothesis and the second value of hypothesis of the second received radio frame, averaging the first hypothesis and the second hypothesis to obtain an averaged hypothesis for estimating the carrier frequency offset.

The method further includes performing a discrete fourier transformation (DFT) on the averaged hypothesis to obtain a DFT sequence, determining a peak position of the DFT sequence, and estimating the carrier frequency offset based on the peak position of the DFT sequence.

In another aspect, a method of generating a hypothesis for estimating a carrier frequency offset in a receiver is provided. The method includes receiving, from a transmitter, a signal that includes a first received radio frame, and a second received radio frame, each of the first received radio frame and the second received frame includes a received sequence of length N, and a received sequence in the first received radio frame and the second received radio frame is expressed in accordance with an equation: $\{r_n(j): j=0, \ldots N-1 \ \& \ n=0, 1 \ldots\}$, dividing the first received radio frame into a first received sub-sequence, and a second received sub-sequence, the first received sub-sequence and the second received sub-sequence of the first received radio frame are of equal length, dividing, a first radio reference frame stored in a memory of the receiver, into a first referenced sub-sequence, and a second referenced sub-sequence, the first reference sub-sequence and the second reference sub-sequence of the first radio reference frame are of equal length, correlating (i) the first received sub-sequence of the first received radio frame with the first referenced sub-sequence of the first reference radio frame, and (ii) the second received sub-sequence of the first received radio frame with the second referenced sub-sequence of the first reference radio frame to obtain a first correlation value and a second correlation value for the first received radio frame, generating, (i) a first value of hypothesis for the first received radio frame by multiplying a complex conjugate of the first correlation value of the first received radio frame with the first correlation value of the first received radio frame, and (ii) a second value of hypothesis by multiplying the complex conjugate of the first correlation value of the first received radio frame with the second correlation value of the first received radio frame, generating a first hypothesis based on the first value of hypothesis and the second value of hypothesis of the first received radio frame, dividing the second received radio frame into a first received sub-sequence, and a second received sub-sequence, the first received sub-sequence and the second received sub-sequence of the second received radio frame are of equal length, dividing, a second radio reference frame stored in a memory of the receiver, into a first referenced sub-sequence, and a second referenced sub-sequence, the first reference sub-sequence and the second reference sub-sequence of the second radio reference frame are of equal length, and a reference sequence in the first radio reference frame and the second radio reference frame are expressed in accordance with an equation: $\{P(j): j=0, \ldots N-1\}$, where P(j) represents reference sequence, correlating (i) the first received sub-sequence of the second received radio frame with the first referenced sub-sequence of the second referenced radio frame, and (ii) the second received sub-sequence of the second received radio frame with the second referenced sub-sequence of the second referenced radio frame to obtain a first correlation value and a second correlation value for the second received radio frame, the first correlation value, the second correlation value are obtained in accordance with an equation:

$$\{a_{n,i}, t = 0, 1, 2 \ldots m-1\}, \text{ and}$$

$$a_{n,i} = \sum_{i=0}^{\frac{R}{m}-1} P\left(i \times \frac{N}{m} + j\right) \times r_n\left(t \times \frac{N}{m} + j\right),$$

where n=0, ... and i=0, 1, 2 ... m−1, where m is number of subsequence, and N/m represents length of a subsequence, and $a_{n,i}$ represents a correlation value for nth radio frame, generating (i) a first value of hypothesis for the second received radio frame by multiplying a complex conjugate of the first correlation value of the second received radio frame with the first correlation value of the second received radio frame, and (ii) a second value of hypothesis for the second received radio frame by multiplying a complex conjugate of the first correlation value of the second received radio frame with the second correlation value of the second received radio frame, the first hypothesis and the second hypothesis are expressed in accordance with an equation:

$$\{h(i) = h(t) + a''_{n0} \times a_{n,i}\},$$

where i=0, 1 ... m−1, and * is complex conjugation, and generating a second hypothesis based on the first value of hypothesis and the second value of hypothesis of the second received radio frame, averaging the first hypothesis and the second hypothesis to obtain an averaged hypothesis {{h(i)} for estimating the carrier frequency offset, performing a discrete fourier transformation (DFT) on the averaged hypothesis {{h(i)} to obtain a DFT sequence, the DFT is performed in accordance with an equation: H(k)=dft({h(i)}), and $$H(k) = \sum_{j=0}^{m-1} h(f) \times e^{\frac{is\pi tk}{K}},$$

where $$i = \sqrt{-1}, k = 0, 1 \ldots, K-1,$$

where h(j) represents hypothesis, and H(k) represents the DFT sequence on the hypothesis, and $K=2^q$, for integer, $q \geq \log_2(m)$, and determining a peak position 'ρ' of the DFT sequence. The peak position 'ρ' is determined in accordance with an equation: ρ=argmax H(k), where k∈{0, 1 ... K−1}, and estimating the carrier frequency offset based on the peak position 'ρ' of the DFT sequence.

The method further includes determining whether the peak position is greater than K/2 in accordance with an equation: ρ>K/2. When ρ>K/2, the carrier frequency offset is estimated and expressed in accordance with an equation:

$$\Delta f_{est} = -(\{K-\rho\}/KT_sL).$$

When ρ≤K/2, the carrier frequency offset is estimated and expressed in accordance with an equation:

$$\Delta f_{est} = +(\rho/KT_sL).$$

$T_s$ represents sampling time duration, Δf represents a maximum CFO, and $\Delta f_{est}$ represents an estimated CFO.

In yet another aspect, a receiver to generate a hypothesis for estimating a carrier frequency offset in the receiver is provided. The receiver receives from a transmitter, a signal that includes a first received radio frame and a second received radio frame, each of the first received radio frame and the second received frame comprises a received sequence of length N, the first received radio frame is divided into a first received sub-sequence, and a second received sub-sequence of equal length, and the second received radio frame is divided into a first received sub-sequence and a second sub-sequence of equal length. The receiver includes a memory that stores a reference signal that includes a first radio reference frame, and a second radio reference frame, the first radio reference frame is divided into a first referenced sub-sequence, and a second referenced sub-sequence. The second radio reference frame is divided into a first referenced sub-sequence, and a second referenced sub-sequence. Each of the first referenced sub-sequence and the second referenced sub-sequence are of equal length.

The receiver further includes a correlation unit that (a) correlates (i) the first received sub-sequence of the first received radio frame with the first referenced sub-sequence of the first referenced radio frame, (ii) the second received sub-sequence of the first received radio frame with the second referenced sub-sequence of the first referenced radio frame to obtain a first correlation value and a second correlation value for the first received radio frame, and (b) correlates (i) the first received sub-sequence of the second received radio frame with the first referenced sub-sequence of the second referenced radio frame, (ii) the second received sub-sequence of the second received radio frame with the second referenced sub-sequence of the second referenced radio frame to obtain a first correlation value and a second correlation value for the second received radio frame, and a hypothesis generation unit that generates (i) a first value of hypothesis for the first received radio frame by multiplying a complex conjugate of the first correlation value of the first received radio frame with the first correlation value of the first received radio frame, (ii) a second value of hypothesis by multiplying the complex conjugate of the first correlation value of the first received radio frame with the second correlation value of the first received radio frame, (iii) a first hypothesis based on the first value of hypothesis and the second value of hypothesis of the first received radio frame, (iv) a first value of hypothesis for the second received radio frame by multiplying a complex conjugate of the first correlation value of the second received radio frame with the first correlation value of the second received radio frame, (v) a second value of hypothesis for the second received radio frame by multiplying a complex conjugate of the first correlation value of the second received radio frame with the second correlation value of the second received radio frame, (vi) a second hypothesis based on the first value of hypothesis and the second value of hypothesis of the second received radio frame, and (vii) an averaged hypothesis for estimating the carrier frequency offset based on the first hypothesis and the second hypothesis.

The receiver further includes a discrete fourier transformation unit that performs a DFT on the averaged hypothesis to obtain a DFT sequence, a peak position determination unit that determines a peak position from the DFT sequence obtained based on the DFT performed on the averaged hypothesis, and a carrier frequency estimation unit that estimates a carrier frequency offset based on the peak position determined from the DFT sequence.

In a further aspect, a receiver to generate a hypothesis for estimating a carrier frequency offset in the receiver is provided. The receiver receives a signal from a transmitter. The signal includes a first received radio frame and a second received radio frame. Each of the first received radio frame and the second received frame includes a received sequence of length N. The first received radio frame is divided into a first received sub-sequence, and a second received sub-sequence of equal length. The second received radio frame is divided into a first received sub-sequence and a second sub-sequence of equal length. The receiver includes a memory that stores a reference signal. The signal includes a first radio reference frame, and a second radio reference frame. The first radio reference frame is divided into a first referenced sub-sequence and a second referenced sub-sequence. The second radio reference frame is divided into a first referenced sub-sequence and a second referenced sub-sequence. The first referenced sub-sequence, and the second referenced sub-sequence are of equal length. The received sequence in the first received radio frame and the second received radio frame is expressed in accordance with an equation: $\{r_n(j): j=0, \ldots N-1 \, \& \, n=0, 1 \ldots\}$, and a reference sequence in the first radio reference frame and the second radio reference frame is expressed in accordance with an equation: $\{P(j): j=0, \ldots N-1\}$.

The receiver further includes a correlation unit that (a) correlates (i) the first received sub-sequence of the first received radio frame with the first referenced sub-sequence of the first referenced radio frame, (ii) the second received sub-sequence of the first received radio frame with the second referenced sub-sequence of the first referenced radio frame to obtain (a) a first correlation value and a second correlation value for the first received radio frame, and (b) correlates (i) the first received sub-sequence of the second received radio frame with the first referenced sub-sequence of the second referenced radio frame, (ii) the second received sub-sequence of the second received radio frame with the second referenced sub-sequence of the second referenced radio frame to obtain a first correlation value and a second correlation value for the second received radio frame. The first correlation value, and the second correlation value for the first received radio frame and the second received radio frame, are obtained in accordance with an equation: $\{a_{n,i}, i=0, 1, 2 \ldots m-1\}$, and $$\alpha_{n,i} \sum_{j=0}^{\frac{K}{m}-1} P\left(t \times \frac{N}{m} + j\right) \times r_n\left(t \times \frac{N}{m} + j\right).$$

Where $n=0, 1, \ldots$ and $i=0, 1, 2 \ldots m-1$, m is number of subsequence, N/m represents length of a subsequence, and $a_{n,i}$ represents a correlation value for nth radio frame.

The receiver further includes a hypothesis generation unit that generates (i) a first value of hypothesis for the first received radio frame by multiplying a complex conjugate of the first correlation value of the first received radio frame with the first correlation value of the first received radio frame, (ii) a second value of hypothesis by multiplying the complex conjugate of the first correlation value of the first received radio frame with the second correlation value of the first received radio frame, (iii) a first hypothesis based on the first value of hypothesis and the second value of hypothesis of the first received radio frame, (iv) a first value of hypothesis for the second received radio frame by multiplying a complex conjugate of the first correlation value of the second received radio frame with the first correlation value of the second received radio frame, (v) a second value of hypothesis for the second received radio frame by multiplying a complex conjugate of the first correlation value of the second received radio frame with the second correlation value of the second received radio frame, (vi) a second hypothesis based on the first value of hypothesis and the second value of hypothesis of the second received radio frame, and (vii) an averaged hypothesis for estimating the carrier frequency offset based on the first hypothesis and the second hypothesis. The averaged hypothesis is expressed in accordance with an equation: $\{h(t)=h(t)+a_{n,0}* \times a_{n,i}\}$, where $i=0, 1 \ldots m-1$, * is complex conjugation, and $\{h(t)\}$ is the averaged hypothesis.

The receiver further includes a discrete fourier transformation unit that performs a discrete fourier transformation (DFT) on the averaged hypothesis $\{\{h(i)\}$ to obtain a DFT sequence. The DFT is performed in accordance with an equation: $H(k)=dft(\{h(i)\})$, and $$H(k) = \sum_{j=0}^{m-1} h(f) \times e^{\frac{is\pi tk}{K}},$$

where $i=\sqrt{-1}=0, 1 \ldots K-1$, h(j) represents hypothesis, H(k) represents the DFT sequence on the hypothesis, and $K=2^q$, for integer, $q \geq \log_2(m)$.

The receiver further includes a peak position determination unit that determines a peak position from the DFT sequence obtained based on the DFT performed on the averaged hypothesis. The peak position 'ρ' is determined in accordance with an equation: $\rho=\text{argumax } H(k)$, where $k \in \{0, 1 \ldots K-1\}$. The receiver further includes a carrier frequency estimation unit that estimates a carrier frequency offset based on the peak position 'ρ' determined from the DFT sequence.

The carrier frequency estimation unit determines whether the peak position 'ρ' is greater than K/2 in accordance with an equation: $\rho > K/2$. When $\rho > K/2$, the carrier frequency offset is estimated and expressed in accordance with an equation: $\Delta f_{est}=-(\{K-\rho\}/KT_sL)$. When $\rho \leq K/2$, the carrier frequency offset is estimated and expressed in accordance with an equation: $\Delta f_{est}=+(\rho/KT_sL)$. $T_s$ represents sampling time duration, $\Delta f$ represents a maximum CFO, $\Delta f_{est}$ represents an estimated CFO.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 9, with reference to FIGS. 4 through 8, is a table view illustrating a comparison of computation complexity between the conventional methods of FIGS. 2-3, and the proposed method of the FIGS. 4-6C according to an embodiment herein; and FIGS. 10A-10C, through FIGS. 4-9, is a flow diagram illustrating a method of generating a hypothesis and estimating a carrier frequency offset in the receiver of FIG. 4 based on the hypothesis according to an embodiment herein.

DETAILED DESCRIPTION OF PREFERRED EMBODIMENTS

Figure 1:
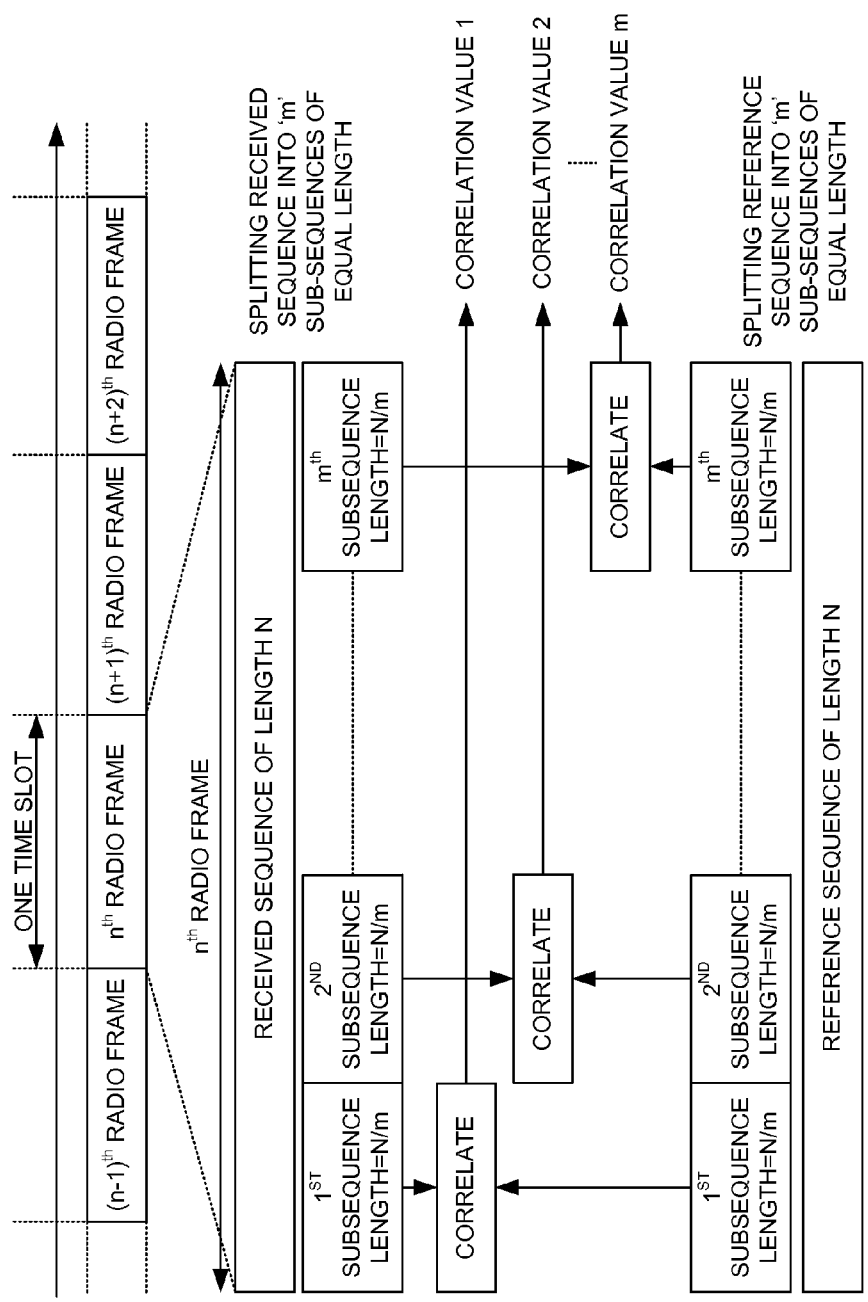
FIG. 1 illustrates a conventional method of receiving an nth radio frame from a transmission signal and dividing the radio frame into two or more equal-duration time slots.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need to accurately estimate a carrier frequency offset and correct it in the receiver without having to increase the computations, the cost, and at the same time balance the performance of the receiver. The embodiments herein achieve this by providing a receiver that (i) generates two or more hypothesis for two or more radio frames by multiplying complex conjugate of a correlation value with subsequent correlation values, (ii) averages the two or more hypothesis to obtain an averaged hypothesis, (iii) performs a discrete fourier transformation (DFT) on the averaged hypothesis to obtain a DFT sequence, (iv) determines a peak position on the DFT sequence, and (v) estimates a carrier frequency offset based on the peak position on the DFT sequence. Referring now to the drawings, and more particularly to FIGS. 4 through 10C, where similar reference characters denote corresponding features consistently throughout the figures, there are shown preferred embodiments.

Figure 4:
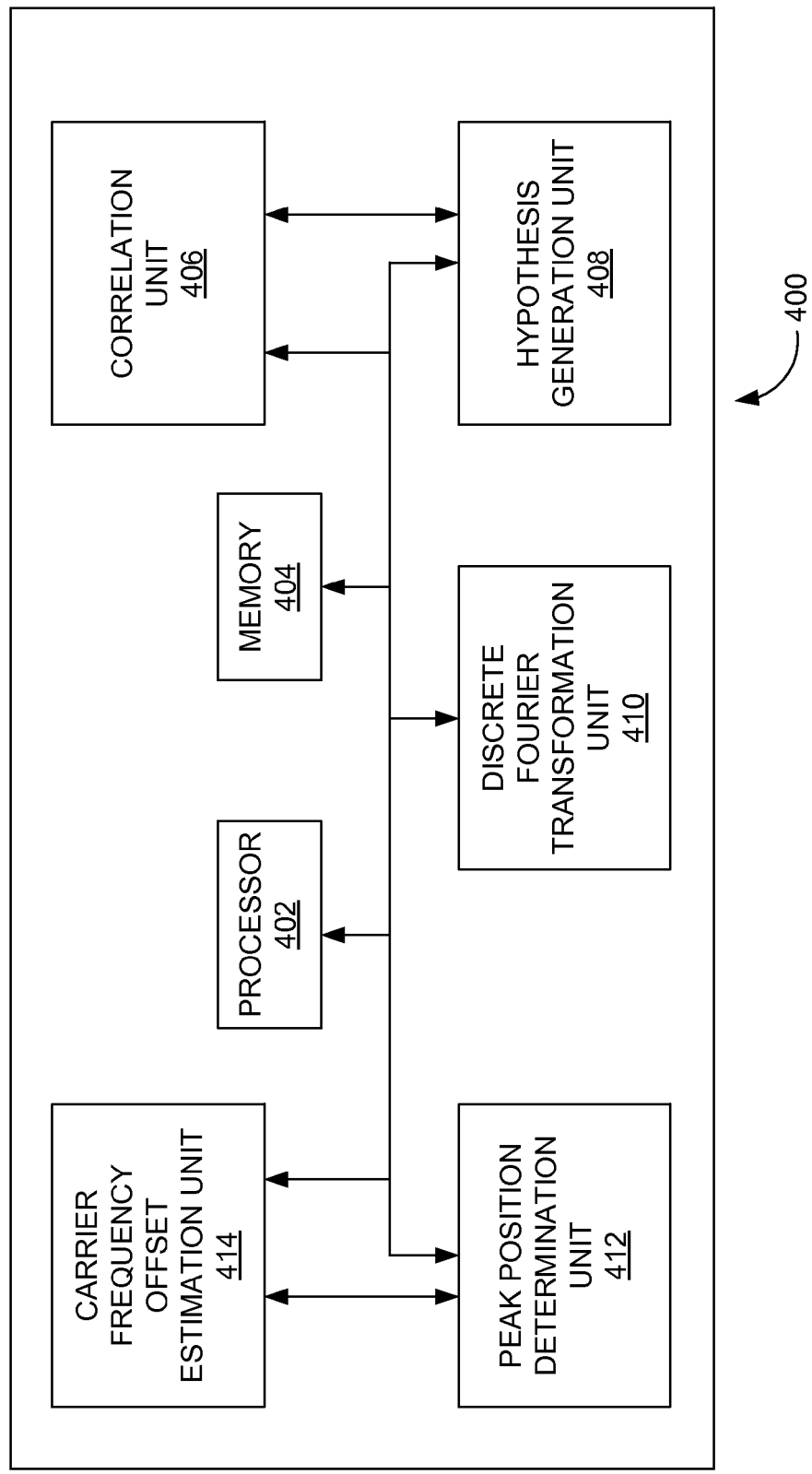
FIG. 4 illustrates a block diagram of a receiver according to an embodiment herein.

FIG. 4 illustrates a block diagram of a receiver 400 according to an embodiment herein. In a preferred embodiment, the receiver 400 is a WCDMA receiver. The WCDMA receiver 100 includes a processor 402, a memory 404 that stores (i) one or more referenced radio frames, and instructions to configure the processor 402, a correlation unit 406, a hypothesis generation unit 406, a discrete fourier transformation (DFT) unit 408, and a peak position determination unit 410, and a carrier frequency offset estimation unit 412. The processor 402 executes the correlation unit 406, the hypothesis generation unit 408, the discrete fourier transformation (DFT) unit 410, and the peak position determination unit 412, and the carrier frequency offset estimation unit 414. The correlation unit 406 receives a first radio frame of length 'N' transmitted by a transmitting device (e.g., a transmitter). The first radio frame is divided into 'm' sub-sequences (e.g., two or more 'm' sub-sequences), each sub-sequence having a length (N/m). For example, the first received radio frame is divided into a first received sub-sequence, and a second received sub-sequence. Similarly, the correlation unit 406 receives a second radio frame of the same length 'N' transmitted by the transmitting device (e.g., the transmitter), and the second received radio frame is divided into a first received sub-sequence, and a second received sub-sequence. Likewise, a first reference radio frame (stored in the memory 404) is divided into a first reference sub-sequence, and a second reference sub-sequence. Similarly, a second reference radio frame (stored in the memory 404) is divided into a first reference sub-sequence, and a second reference sub-sequence. Each sub-sequence of the received radio frames is correlated with a corresponding sub-sequence of a reference radio frame that is stored in the memory 404 of the receiver 400 to obtain 'm' correlation values (e.g., one or more correlation values). The correlation unit 406 correlates (i) the first received sub-sequence of the first received radio frame with the first reference sub-sequence of the first reference radio frame, and (ii) the second received sub-sequence of the first received radio frame with the second referenced sub-sequence of the first reference radio frame to obtain a first correlation value and a second correlation value for the first received radio frame. Similarly, the correlation unit 406 correlates (i) the first received sub-sequence of the second received radio frame with the first reference sub-sequence of the second reference radio frame, and (ii) the second received sub-sequence of the second received radio frame with the second reference sub-sequence of the second reference radio frame to obtain a first correlation value and a second correlation value for the second received radio frame. For example, a first set of 'm' correlation values for a first received radio frame may include a first correlation value C11, a second correlation value C12, and a third correlation value C13, . . . a mth correlation value C1m, etc. Similarly, a second set of 'm' correlation values for a second received radio frame may include a first correlation value C21, a second correlation value C22, a third correlation value C23, and a mth correlation value C2m, in another example embodiment.

The hypothesis generation unit 408 generates (i) a first value of hypothesis for the first received radio frame (e.g., h1(1)) by multiplying a complex conjugate of the first correlation value C11 with the first correlation value C11, (ii) a second value of hypothesis for the first received radio frame (e.g., h1(2)) by multiplying the complex conjugate of the first correlation value C11 with the second correlation value C12, (iii) a third value of hypothesis for the first received radio frame (e.g., h1(3)) by multiplying the complex conjugate of the first correlation value C11 with the third correlation value C13, and mth value of hypothesis for the first received radio frame (e.g., h1(m)) by multiplying the complex conjugate of the first correlation value C11 with the mth correlation value C1m. Similarly, the hypothesis generation unit 408 generates (i) a first value of hypothesis for the second received radio frame (e.g., h2(1)) by multiplying a complex conjugate of the first correlation value C21 with the first correlation value C21, (ii) a second value of hypothesis for the second received radio (e.g., h2(2)) frame by multiplying the complex conjugate of the first correlation value C21 with the second correlation value C22, (iii) a third value of hypothesis for the second received (e.g., h2(3)) radio frame by multiplying the complex conjugate of the first correlation value C21 with the third correlation value C23, and mth value of hypothesis for the second received radio frame (e.g., h2(m)) by multiplying the complex conjugate of the first correlation value C21 with the mth correlation value C2m. It is to be understood to a person having ordinary skill in the art that (i) a second radio frame (e.g., the second received radio frame) is received from the transmitter, (ii) the received second radio frame is divided into 'm' sub-sequences, and (iii) correlating the 'm' sub-sequences of the second received radio frame with 'm' sub-sequences of the second reference radio frame stored in the memory of the receiver 400 to obtain the correlation values C21, C22, C23, and C2m of the second received radio frame. Thus, each radio frame is divided into 2 or more sub-sequences. The number of sub-sequences is an integer 'm>2', in the preferred embodiment. As way of clarity, the radio frame (e.g., a received radio frame from a transmitter, and a reference radio frame stored in the memory 404) is divided into a 1st subsequence, a 2nd subsequence, and mth subsequence of equal lengths.

The hypothesis generation unit 408 further generates (a) a first hypothesis for the first received radio frame based on (i) the first value of hypothesis, (ii) the second value of hypothesis, (iii) the third value of hypothesis, and mth value of hypothesis of the first received radio frame, and (b) a second hypothesis for the second received radio frame based on (i) the first value of hypothesis, (ii) the second value of hypothesis, (iii) the third value of hypothesis, and mth value of hypothesis of the second received radio frame. It is to be understood to a person having ordinary skill in the art that hypothesis generation unit 408 further generates a nth hypothesis for the nth received radio frame. The first hypothesis for the first received radio frame may be expressed in accordance with an equation:

$$\text{hyp\_frame1} = \{h1(1), h1(2), h1(3) \ldots h1(m)\}$$

Similarly, the second hypothesis for the second received radio frame may be expressed in accordance with an equation:

$$\text{hyp\_frame2} = \{h2(1), h2(2), h2(3) \ldots h2(m)\}$$

Likewise, a mth hypothesis for the mth received radio frame may be expressed in accordance with an equation:

$$\text{hyp\_frame}n = \{hn(1), hn(2), hn(3) \ldots hn(m)\}$$

The hypothesis generation unit 408 averages the first hypothesis and the second hypothesis to obtain an averaged hypothesis (h(i)). The hypothesis generation unit 408 includes an average computation unit (not shown in FIG. 4) that computes the averaged hypothesis (h(i)) based on the first hypothesis and the second hypothesis. It is to be understood to a person having ordinary skill in the art that the third hypothesis for the third received radio frame, a fourth hypothesis for the fourth received radio frame, and . . . nth hypothesis for the nth received radio frame may also be considered to compute the averaged hypothesis (h). The averaged hypothesis (h(i)) is computed by adding hypothesis from frame 1 to hypothesis from frame 2 position-wise to obtain 2-frame averaged hypothesis. The averaged hypothesis is computed and expressed in accordance with an equation:

$$h(i) = \{h1(1)+h2(1), h1(2)+h2(2), h1(3)+h2(3) \ldots h1(m)+h2(m)\}.$$

The above averaged hypothesis depicts for the first value, and the second value of hypothesis for the first hypothesis, the second hypothesis, in one example embodiment. In other words, the averaged hypothesis is computed by adding (i) the first value in the first hypothesis with the first value in the second hypothesis, and (ii) the second value in the first hypothesis with the second value in the second hypothesis, in the preferred embodiment. The computation may be repeated for the third hypothesis, the fourth hypothesis, subsequent hypothesis, till nth hypothesis to obtain the averaged hypothesis (h(i)), in another example embodiment.

Thus, when a nth received radio frame is available, the n-frame-averaged-hypothesis which is a length-m sequence may be computed and expressed in accordance with an equation:

$$\{h1(1)+h2(1)+h3(1)+ \ldots +hn(1),$$

$$h1(2)+h2(2)+h3(2)+ \ldots +hn(2),$$

$$\ldots$$

$$h1(m)+h2(m)+h3(m)+ \ldots +hn(m)\}$$

As way of clarity and understanding of the proposed embodiments and methodology described herein, the averaged hypothesis which is computed based on the first hypothesis and the second hypothesis is considered. It is evident that the hypothesis generation technique used in the proposed method of FIG. 4 is different from the hypothesis technique as depicted in the conventional methods of FIGS. 2-3.

The discrete fourier transformation (DFT) unit 410 performs a DFT on the averaged hypothesis (h) to obtain a peak position of a DFT sequence. The peak position determination unit 412 determines the peak position of the DFT sequence. The carrier frequency offset estimation unit 414 estimates a carrier frequency offset based on the peak position of the DFT sequence. It is to be understood to a person having ordinary skill in the art that the accuracy in the CFO estimation may be improved when (i) subsequent hypothesis are generated for sub-sequent radio frames, (ii) the subsequent hypothesis are added the first hypothesis and the second hypothesis to obtain an averaged hypothesis, (iii) the DFT is performed on the averaged hypothesis (that is based on the subsequent hypothesis added to the first hypothesis and the second hypothesis) to obtain a peak position of a DFT sequence, and (iv) a carrier frequency offset is estimated based on the peak position of the DFT sequence.

Figure 5A:
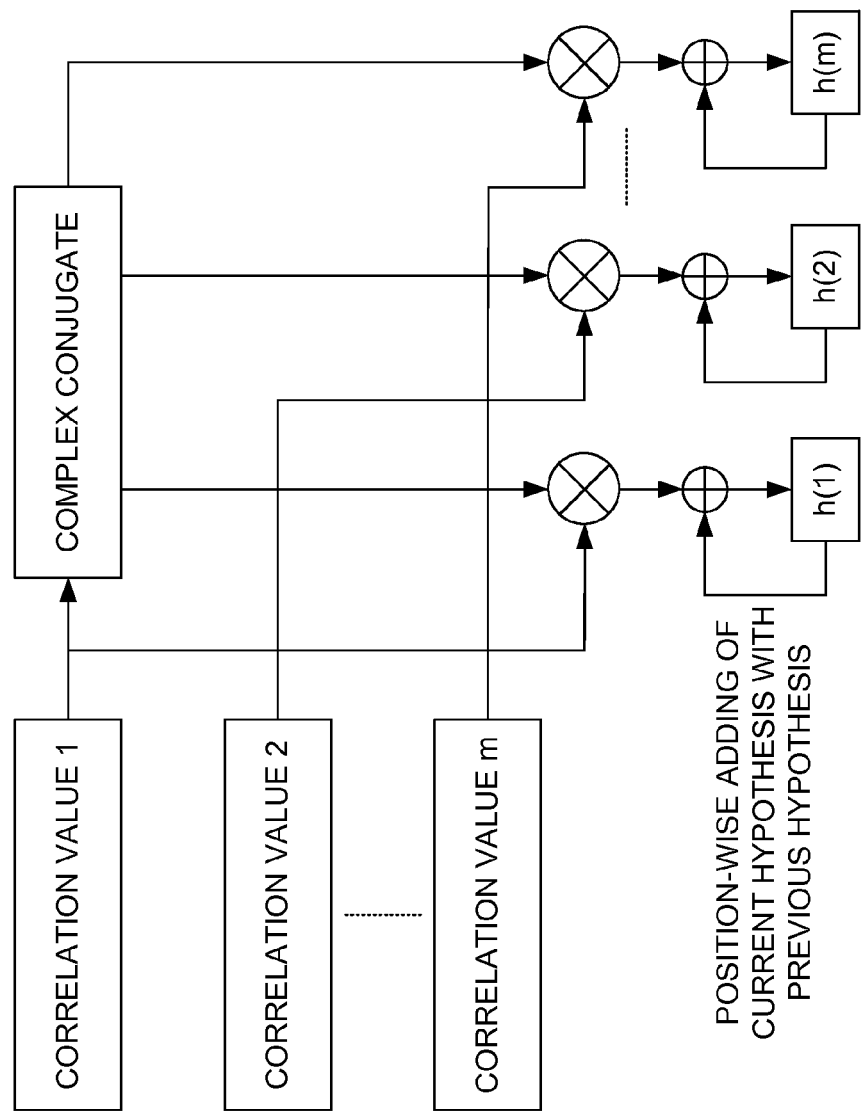
FIG. 5A illustrates a schematic diagram of generating one or more hypothesis using the hypothesis generation unit in the receiver of FIG. 4 according to an embodiment herein.

With reference to FIG. 4, FIG. 5A illustrates a schematic diagram of generating one or more hypothesis using the hypothesis generation unit 404 in the receiver 400 of FIG. 4 according to an embodiment herein. As described in FIG. 4, one or more correlation values are obtained by correlating (i) two or more sub-sequences corresponding to one or more received radio frames from a transmitter with (ii) two or more sub-sequences corresponding to one or more referenced radio frames stored in the memory of the receiver 400. Similarly, two or more hypothesis (e.g., h1, h2, and h(n), etc.) are generated, each hypothesis is specific to a radio frame. For example, hypothesis h1 is specific to a radio frame f1. Similarly, hypothesis h2 is specific to a radio frame 2, and hypothesis h(n) is specific to a radio frame rn. The hypothesis h(1), h(2), . . . h(n) are added together to obtain an averaged hypothesis h(i). In other words, averaging of the hypothesis is done by constructing hypothesis for every received radio frame and position-wise adding of the hypothesis by constructing hypothesis from 'm' correlation values and adding them with past averaged hypothesis—{h(1), h(2) . . . h(n)}.

Figure 5B:
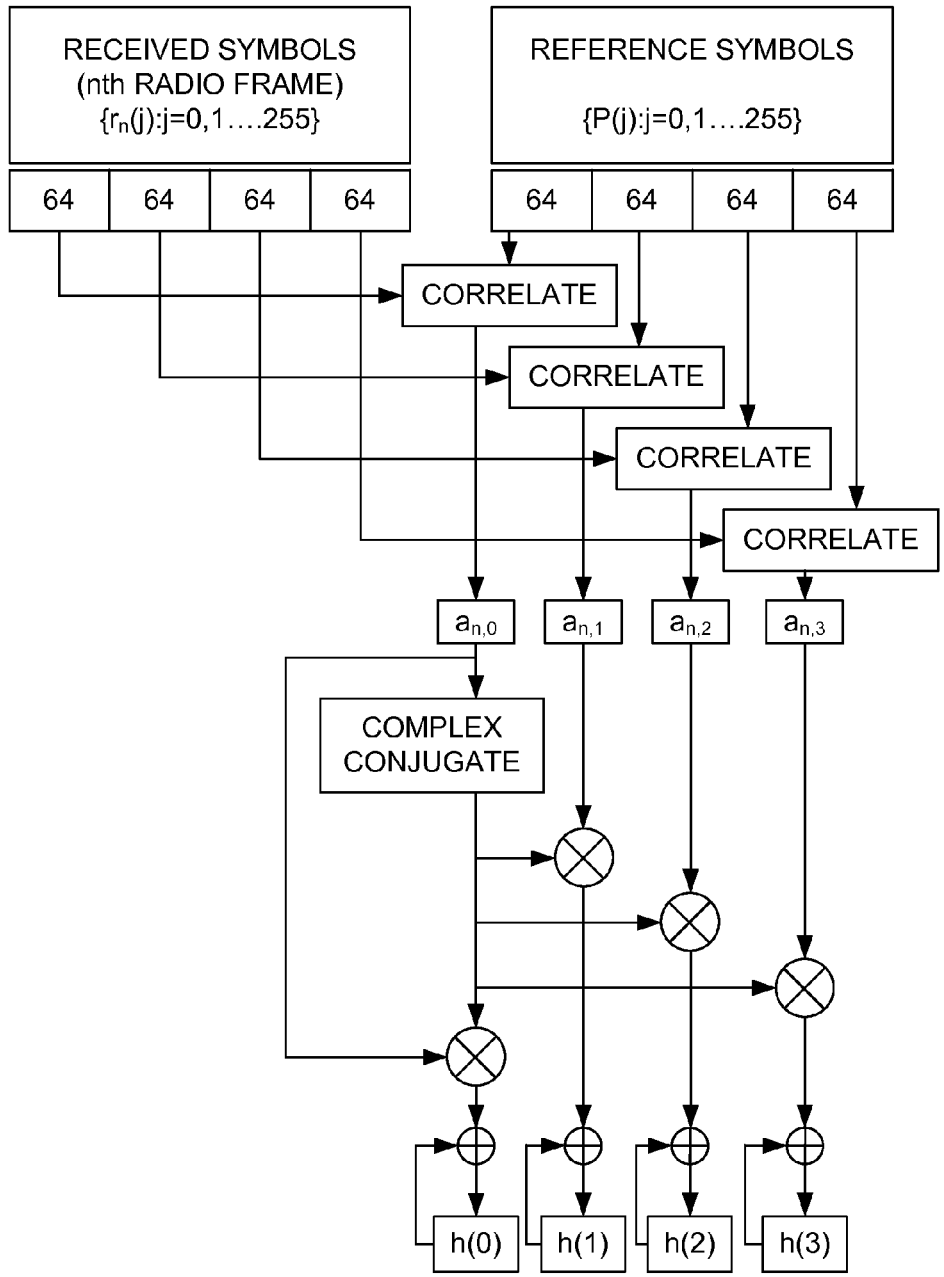
FIG. 5B illustrates a schematic diagram of generating one or more hypothesis using the hypothesis generation unit in the receiver of FIG. 4 for a radio-frame length, N=256, and a sub-sequence length m=64 according to an embodiment herein.

FIG. 5B, with reference to FIGS. 4 and 5A illustrates a schematic diagram of generating one or more hypothesis using the hypothesis generation unit 404 in the receiver 400 of FIG. 4 for a radio-frame length, N=256, and a sub-sequence length m=64 according to an embodiment herein. As described in FIG. 5A, hypothesis h(0), h(1), h(2), and h(3) are generated and averaging of the hypothesis h(0), h(1), h(2), and h(3) is done by constructing hypothesis for every received radio frame and position-wise adding of the hypothesis.

Figure 6A:
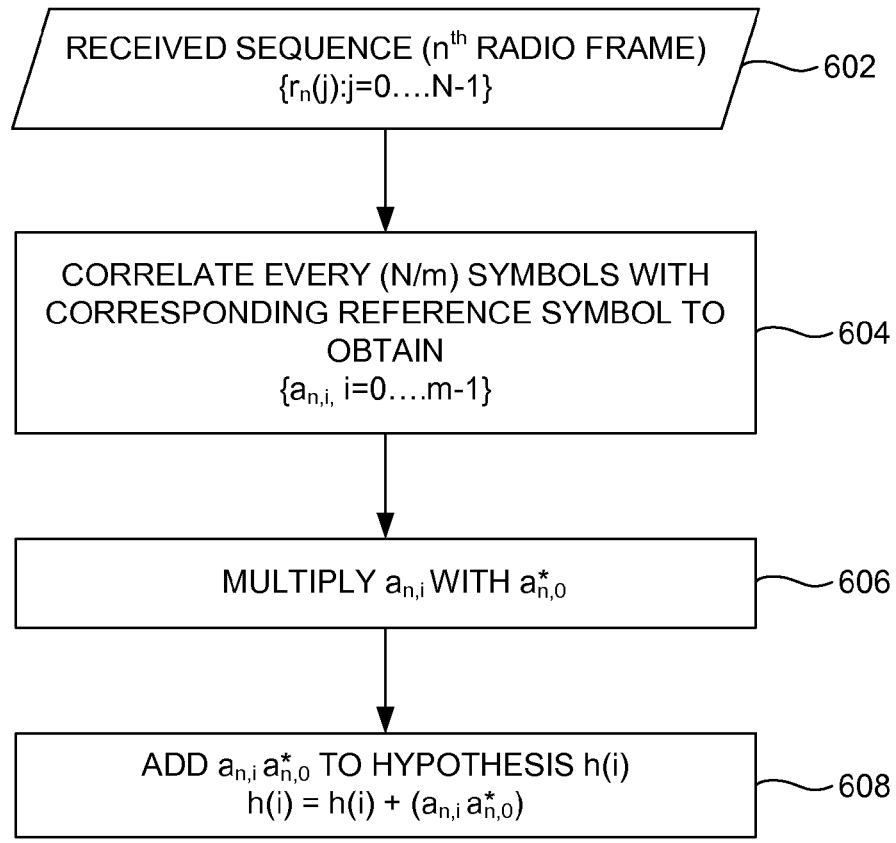
FIG. 6A is a flow chart illustrating a method of generating hypothesis for CFO estimation according to an embodiment herein.

FIG. 6A, with reference to FIGS. 4 through 5B, is a flow chart illustrating a method of generating hypothesis for CFO estimation according to an embodiment herein. In step 602, an nth radio frame (or sequence) is received from a transmitter (not shown in FIG. 6). Let $\{r_n(j): j=0, \ldots N-1 \ \& \ n=0, 1 \ldots\}$, where $r_n(j)$ represents received symbols in the nth radio frame, and N represents length of a radio frame. Let $\{P(j): j=0, \ldots N-1\}$, where $P(j)$ represents reference sequence. In step 604, a sequence of correlation values are constructed (using the correlation unit 406 of FIG. 4). The sequence of correlation values is expressed in accordance with an equation:

$$\{a_{n,i}, i=0, 1, 2 \ldots m-1\},$$

where $a_{n,i}$ represents a correlation value for nth radio frame, $$\alpha_{n,i} = \sum_{j=0}^{\frac{N}{m}-1} P\left(i \times \frac{N}{m} + j\right) \times r_n\left(i \times \frac{N}{m} + j\right)$$

where $n=0, 1, \ldots$ and $i=0, 1, 2 \ldots m-1$, where m is number of subsequence, and N/m represents length of a subsequence. In step 606, correlation values are multiplied (using the correlation unit 406) to generate a first hypothesis, and a second hypothesis (using the hypothesis generation unit 408 of FIG. 4). The first hypothesis and the second hypothesis are generated based on the above correlation methodology described in FIG. 4. In step 608, the first hypothesis and the second hypothesis are averaged to obtain an averaged hypothesis h(t) (using the hypothesis generation unit 404 of FIG. 4). The averaged hypothesis is generated based on the average computation methodology described in FIG. 4.

Hypothesis, $[h(t): t=0, \ldots m-1]$ for estimating CFO is constructed and/or generated in accordance with an equation:

$$\{h(t)=h(t)+a_{n,0}^* \times a_{n,i}\}, \text{ where } i=0, 1 \ldots m-1, \text{ and * is complex conjugation.}$$

Figure 6B:
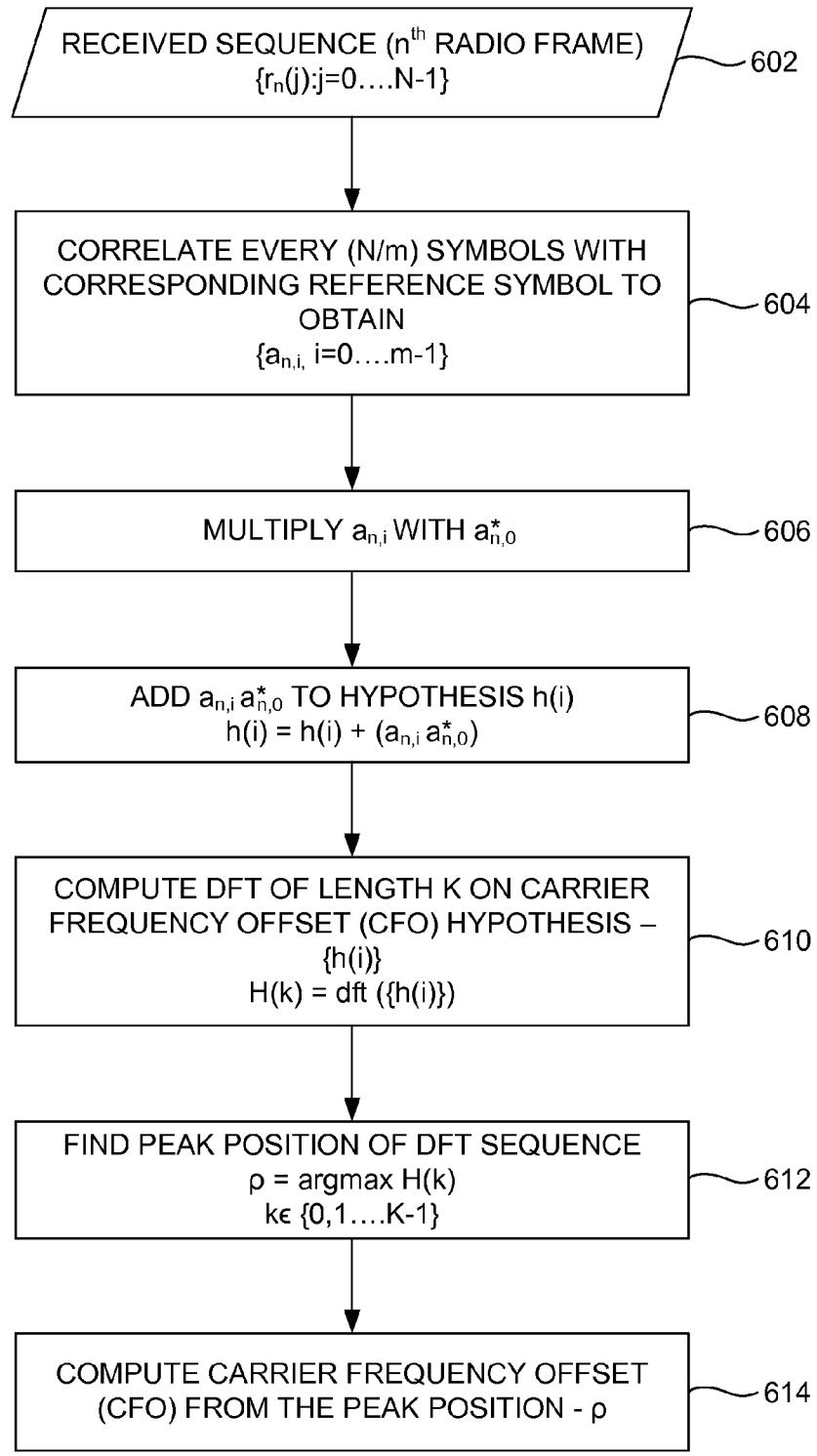
FIG. 6B is a flow chart illustrating a method of estimating a carrier frequency offset based on the averaged hypothesis h(t) of FIG. 6A according to an embodiment herein.

FIG. 6B, with reference to FIGS. 4 through 6A, is a flow chart illustrating a method of estimating a carrier frequency offset based on the averaged hypothesis h(t) of FIG. 6A according to an embodiment herein. As way of clarity, the steps 602-608 are depicted to provide a continuity to FIG. 6B from FIG. 6A. In step 610, a DFT of length K is computed the hypothesis $\{h(i)\}$ (using the discrete fourier transformation (DFT) unit 410 of FIG. 4), and is expressed in accordance with an equation:

$$H(k)=dft(\{h(i)\}).$$

In other words, when CFO is needs to be estimated (e.g., at a decision boundary), DFT of length K is computed over $\{h(i)\}$ (using the discrete fourier transformation (DFT) unit 410 of FIG. 4) as below:

$$H(k) = \sum_{j=0}^{m-1} h(f) \times e^{\frac{is\pi fk}{K}},$$

where $i=\sqrt{-1}$, $k=0, 1 \ldots K-1$, where h(j) represents hypothesis, H(k) represents DFT on the hypothesis, $K=2^q$, for some integer, $q \geq \log_2(m)$ In step 612, a peak position of DFT sequence is determined (using the peak position determination unit 412) and expressed with an equation:

$$\rho = \text{argumax } H(k), \text{ where } k \in \{0, 1 \ldots K-1\}.$$

In step 614, a carrier frequency offset is estimated from the peak position p.

Figure 6C:
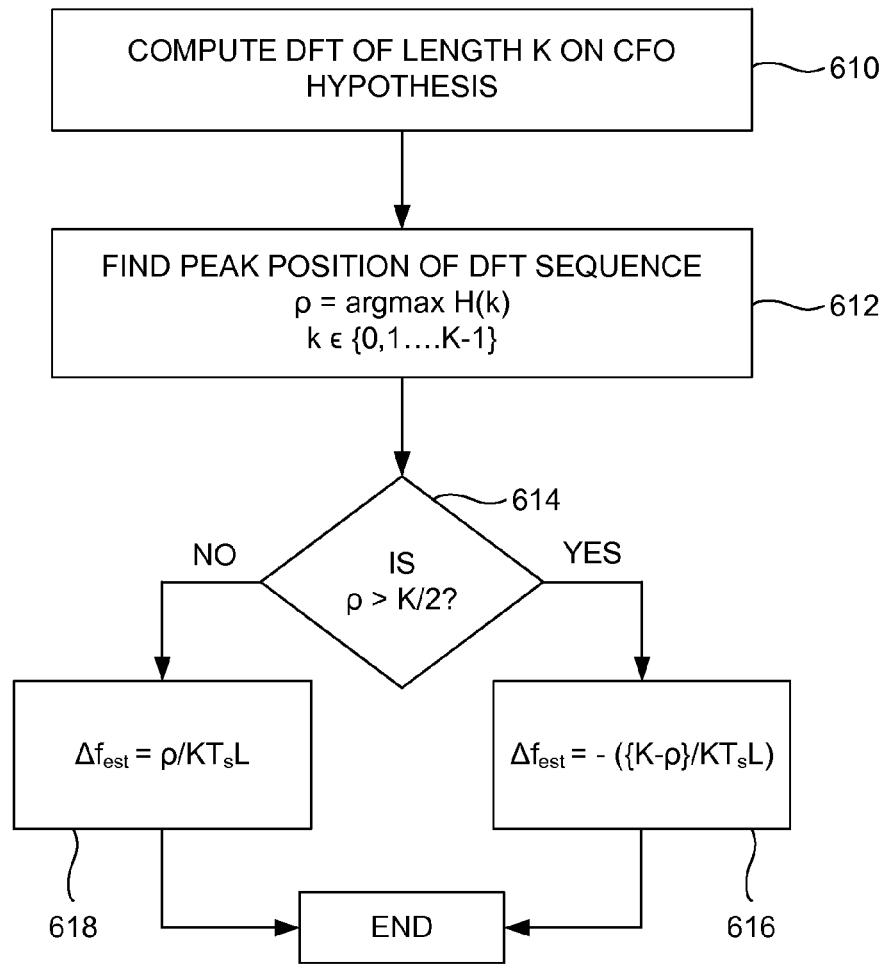
FIG. 6C is a flow chart illustrating a method of estimating the carrier frequency offset from the peak position p of FIG. 6B according to an embodiment herein.

FIG. 6C, with reference to FIGS. 4 through 6B, is a flow chart illustrating a method of estimating the carrier frequency offset from the peak position ρ of FIG. 6B according to an embodiment herein. As way of clarity, the steps 610-612 are depicted to provide a continuity to FIG. 6C from FIG. 6B. In step 614, it is checked whether ρ is greater than K/2.

Let CFO be in the range $(-\Delta f, \Delta f)$, where $\Delta f>0, \{H(k), k=0, 1 \ldots K-1\}$ be the DFT of $\{h(i)\}$ and its maximum be at $k=\rho$. The following formulae estimate positive and negative CFO's. When ρ is greater than K/2 (i.e., ρ>K/2), the CFO is estimated (using the carrier frequency offset estimation unit 414 of FIG. 4), in step 616, in accordance with an equation:

$$\Delta f_{est} = -(\{K-\rho\}/KT_sL), \text{ and the process is terminated.}$$

When ρ is less than, or equal to, K/2 (i.e., ρ≤K/2), the CFO is estimated (using the carrier frequency offset estimation unit 414 of FIG. 4), in step 618, in accordance with an equation:

$$\Delta f_{est} = +(\rho/KT_sL), \text{ and the process is terminated.}$$

$T_s$ represents sampling time duration, $\Delta f$ represents a maximum CFO, and $\Delta f_{est}$ represents estimated CFO.

The frequency resolution of DFT of length 'K' is $1/(KTsL)$, and the worst case accuracy of CFO estimate, when the received signal is uncorrupted by noise, channel or other impairments, is $1/(2KTsL)$. The proposed method of FIGS. 4 through 6C can estimate any CFO in the range $(-\Delta f, \Delta f)$ when, $|\Delta f| < \text{floor}\{1/(2TsL)\}$. When CFO is in the range $(0, \Delta f)$, then estimate is given by $\Delta f_{est} = +(\rho/KT_sL)$ and any CFO in the range $(0, \Delta f)$ can be estimated as long as $\Delta f < \text{floor}\{1/(TsL)\}$.

Figure 2:
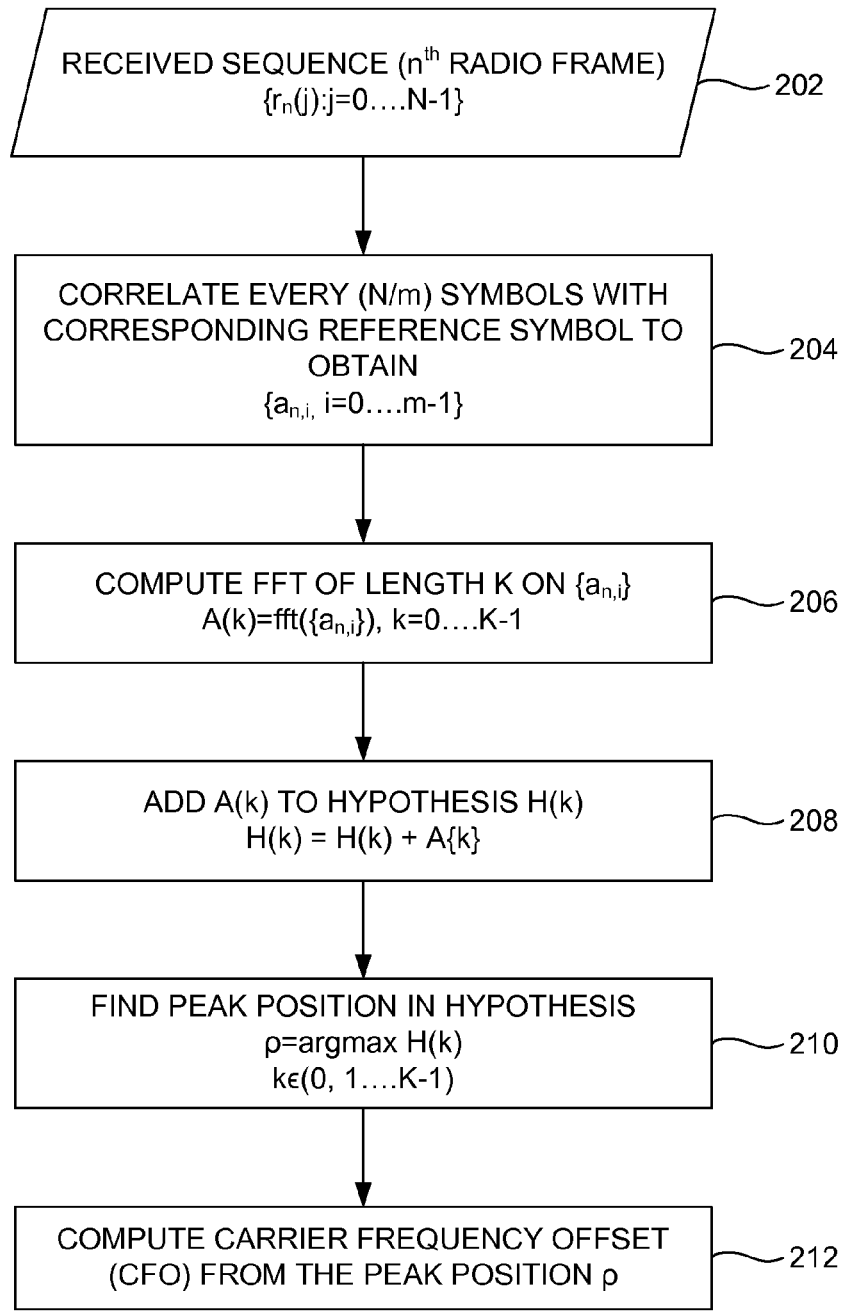
FIG. 2 illustrates a conventional method of estimating a carrier frequency offset using a Fast Fourier Transformation (FFT) technique.

It is evident that the DFT is performed only on the averaged hypothesis and not on every radio frame, which reduces the number of computations, unlike the conventional method of FIG. 2, where the FFT is performed on every radio frame which increases the computations. Thus, the proposed method of FIGS. 4 through 6C is different when compared to the conventional method of FIG. 2 both in terms of generating the hypothesis, and as well estimating a carrier frequency offset.

Figure 7:
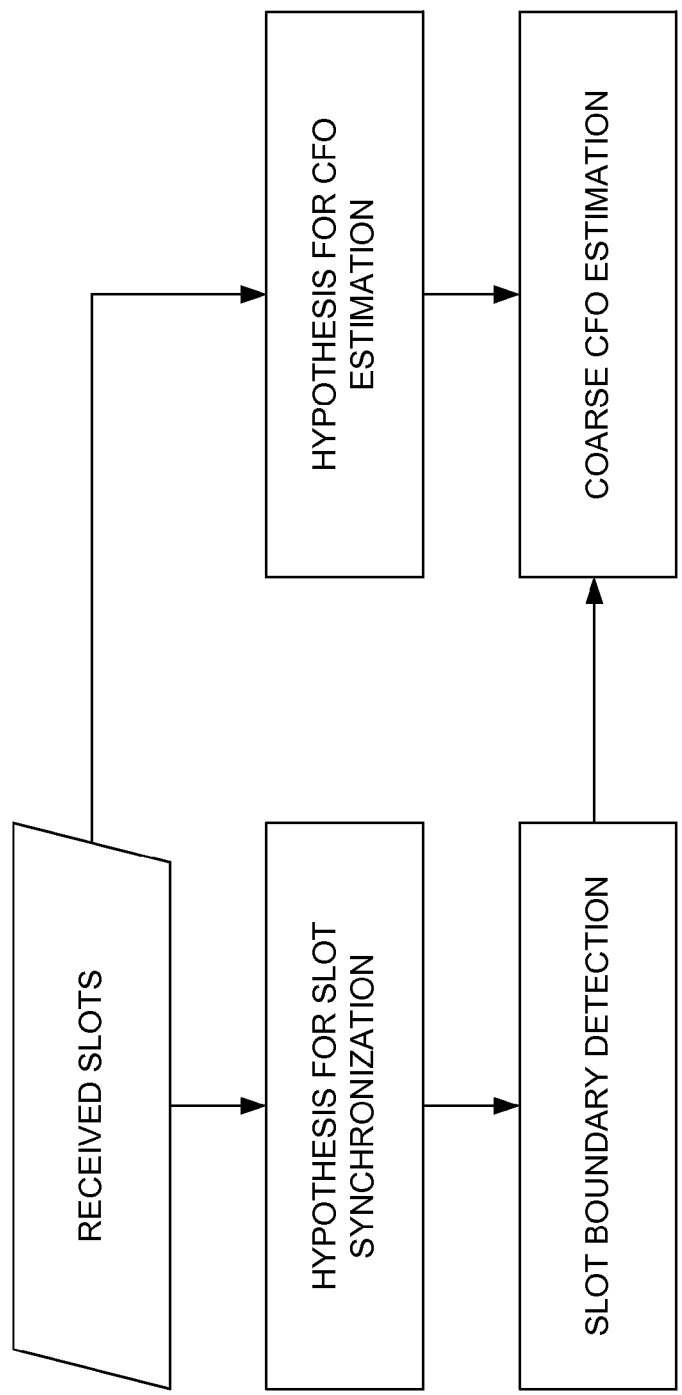
FIG. 7 illustrates the CFO estimation in a synchronization stage in the receiver of FIG. 4 according to an embodiment herein.

FIG. 7, with reference to FIGS. 4 through 6C, illustrates the CFO estimation in a synchronization stage in the receiver 400 of FIG. 4 according to an embodiment herein. During an initial cell search or synchronization stages in CDMA, WCDMA or similar telecommunication technologies, the above method described in FIGS. 4 through 6C, can be employed for coarse frequency estimation. The hypothesis(s) for CFO estimation corresponding to all possible slot boundaries are constructed. When a slot boundary is determined, a corresponding CFO hypothesis gives an estimate of the carrier frequency offset.

For example, in a WCDMA receiver during an initial cell search, 2560 hypothesis are constructed for slot synchronization when sampling duration is 1/3.84 micro seconds (μs). These slot-synchronization hypothesis are derived from correlating received sequence with reference sequence, which is a Golay sequence. Hence 2560 corresponding hypothesis for coarse CFO estimation may be computed with a few more complex multiplications and additions from the method described in FIGS. 4 through 6C. When a slot boundary is determined, coarse CFO can be estimated from the CFO-hypothesis corresponding to the slot boundary.

Figure 3:
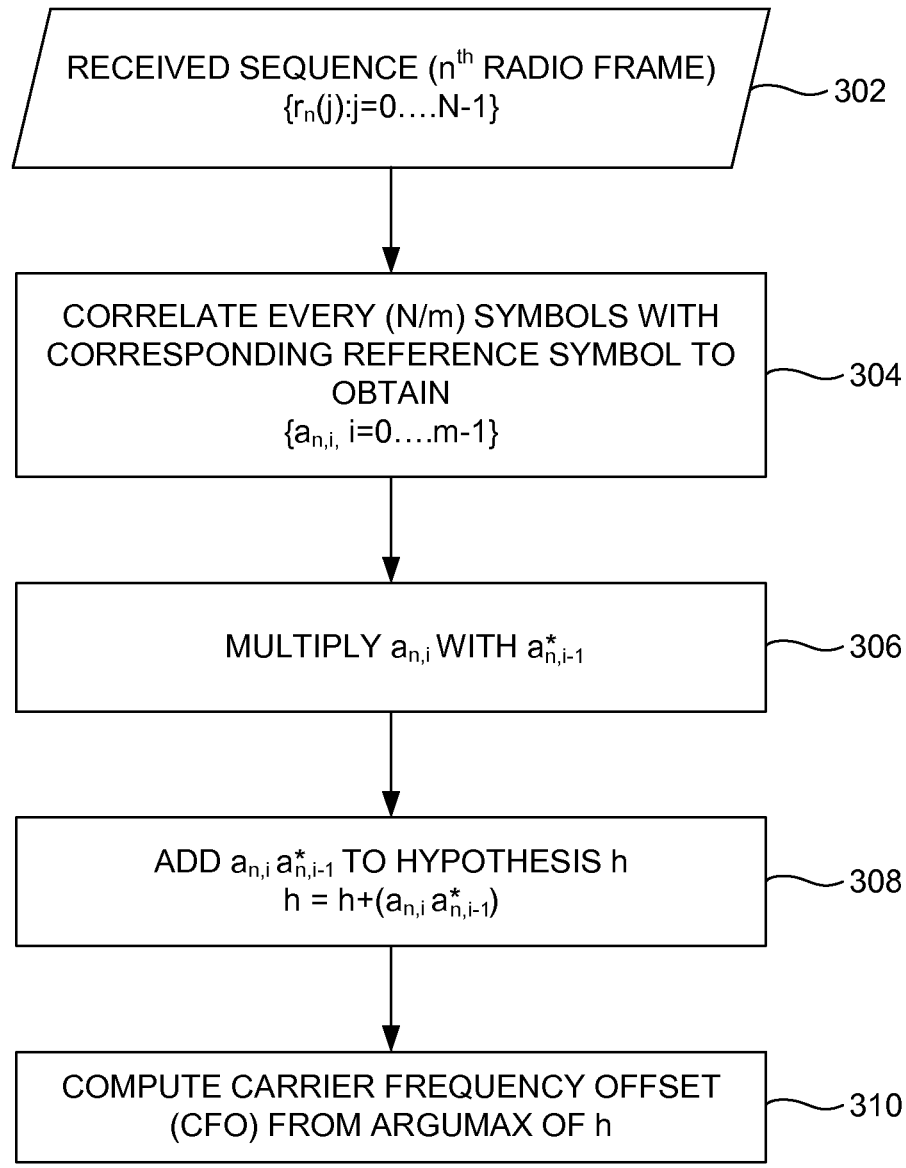
FIG. 3 is a conventional method of estimating a carrier frequency offset using an inner slot differential combining (ISDC) technique.
Figure 8:
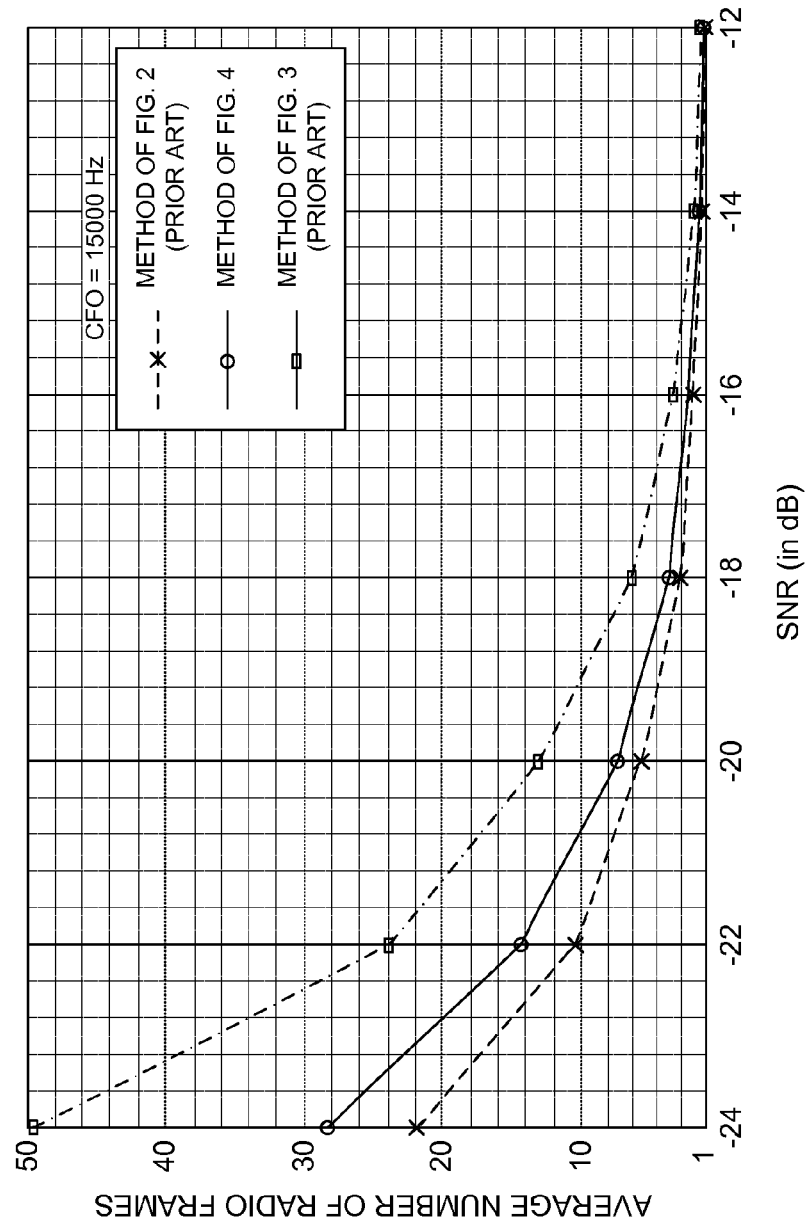
FIG. 8 is a graphical representation illustrating a comparison of CFO estimated by the conventional methods of FIGS. 2-3 and the proposed method of FIGS. 4 through 6C according to an embodiment herein.
Figure 10A:
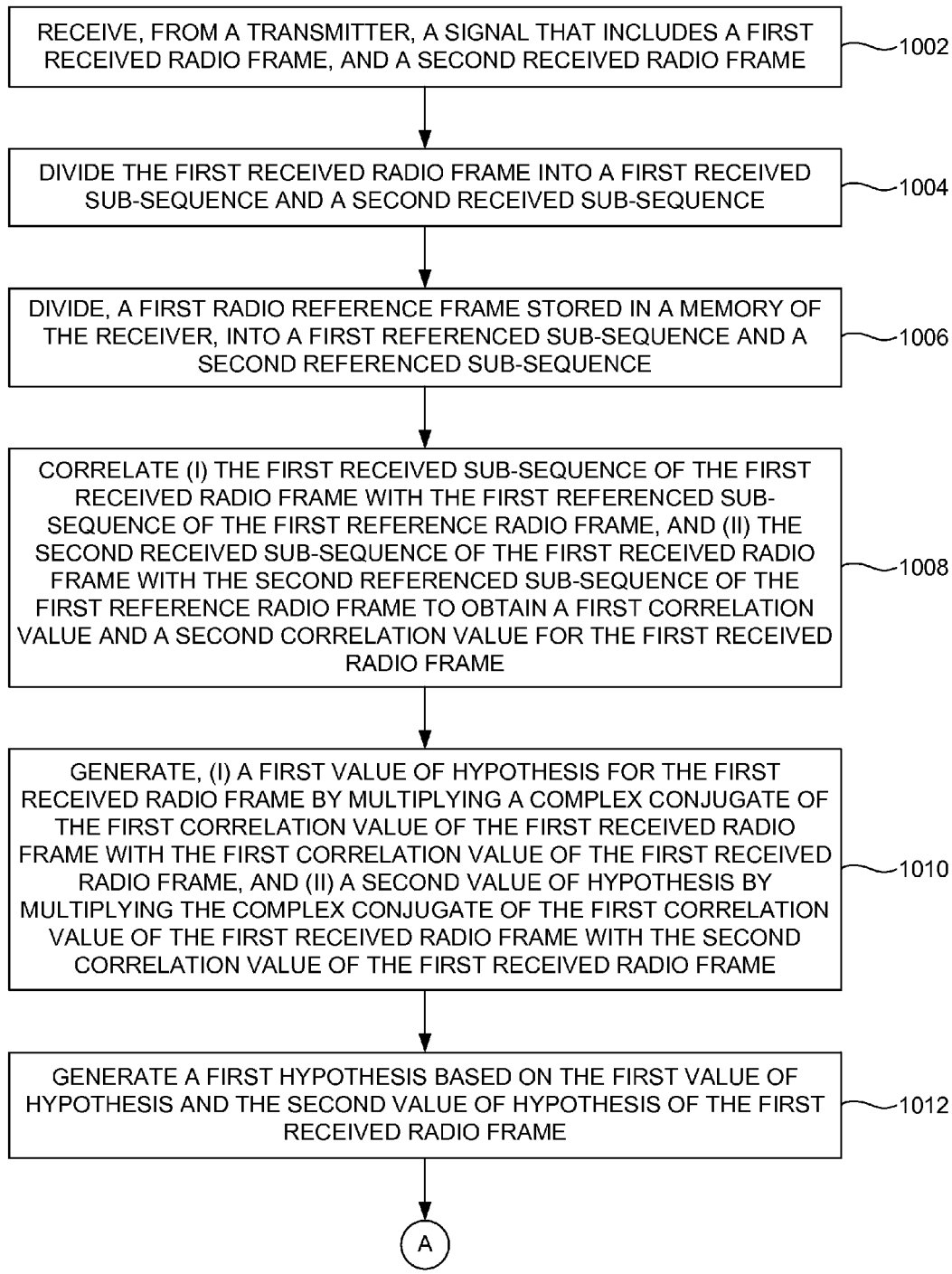
Figure 10B:
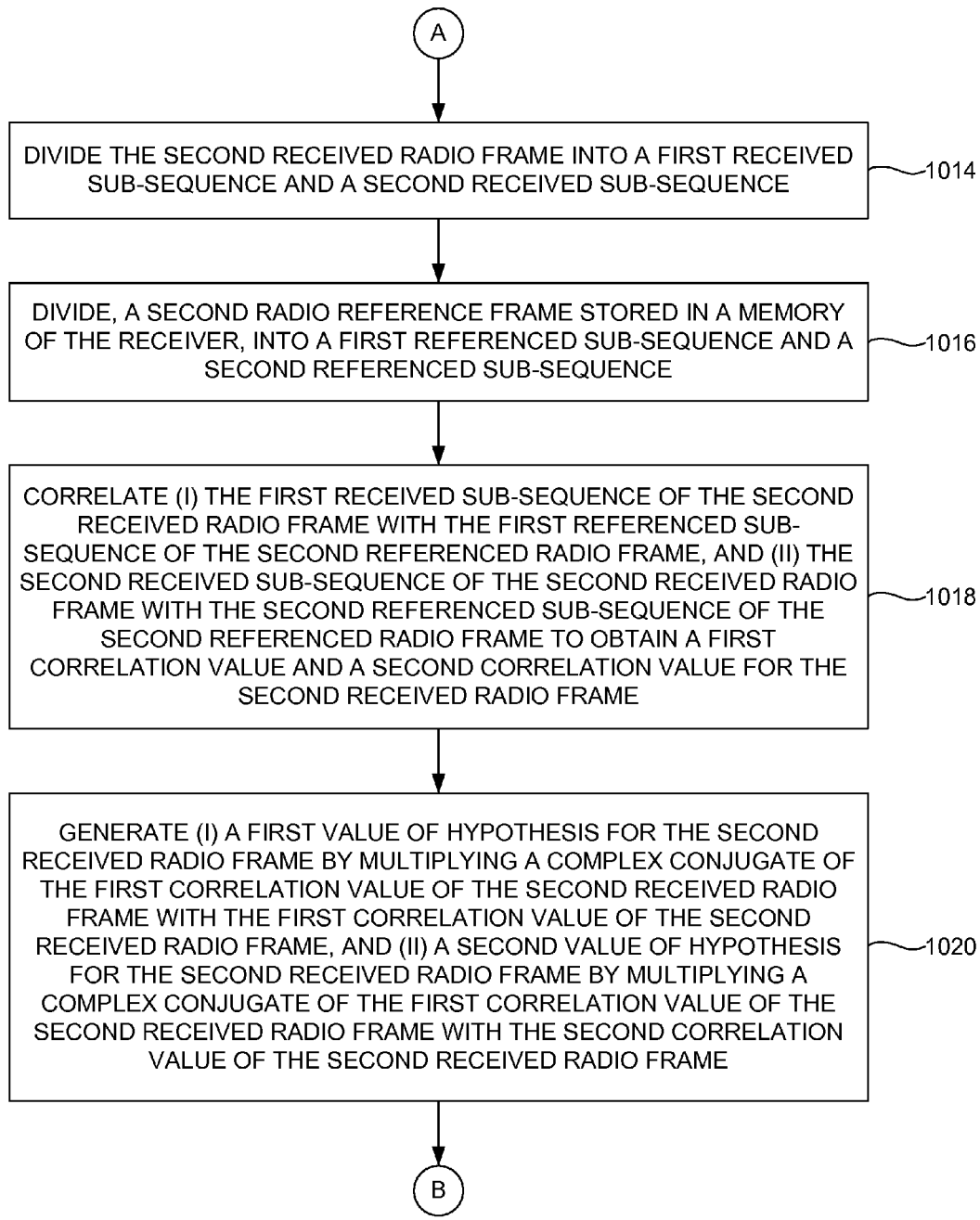
Figure 10C:
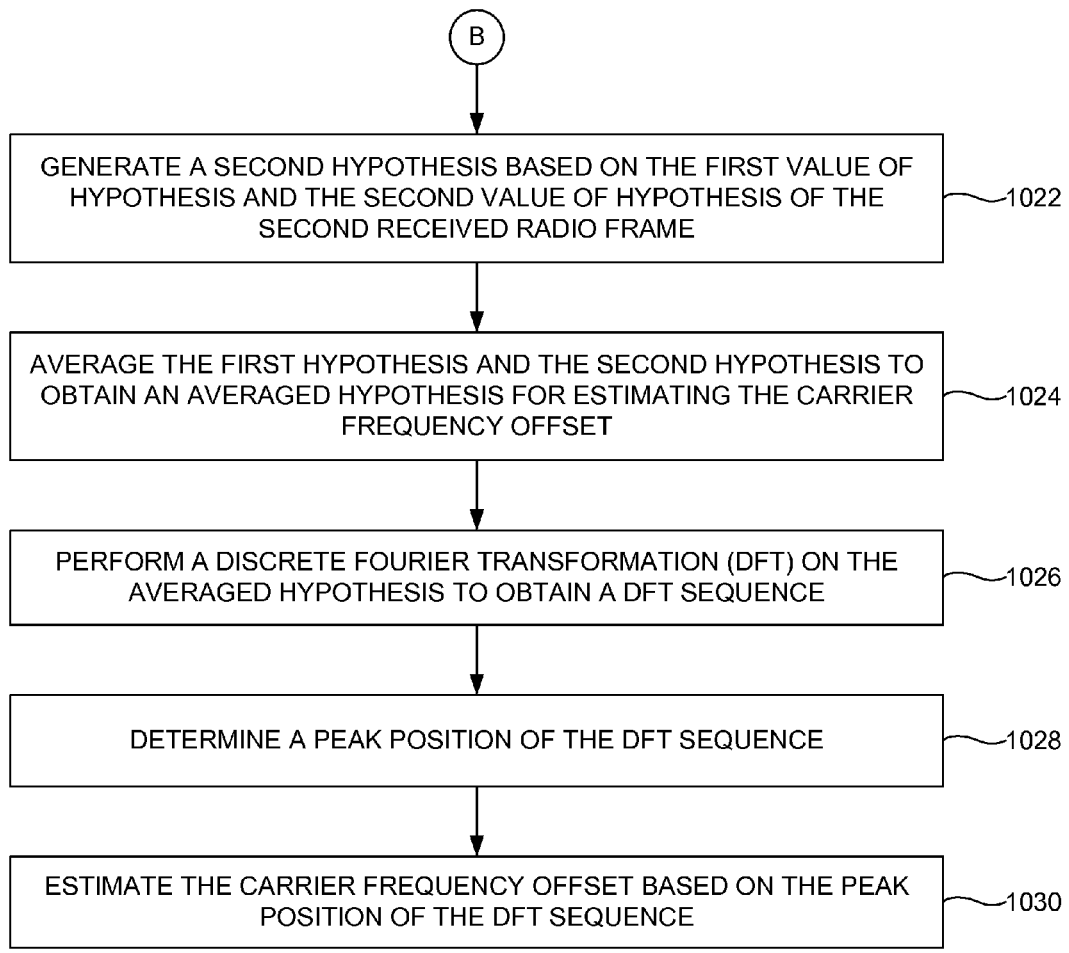

FIG. 8 is a graphical representation illustrating a comparison of CFO estimated by the conventional methods of FIGS. 2-3 and the proposed method of FIGS. 4 through 6C according to an embodiment herein. The graphical representation is illustrated by plotting signal to noise ratio (SNR) in decibels (dB) on X-axis and average number of radio frames consumed for successful CFO estimation on Y-axis. A test case with N=256, m=64, K=64, CFO=15 kHz, Ts=0.25 μs has be considered to characterize the difference between CFO estimated by the conventional methods of FIG. 2, FIG. 3 and the proposed method of FIGS. 4 through 6C. Noise is additive white complex Gaussian with zero mean, reference symbols are complex numbers whose real and imaginary parts take values ±1 with equal probability.

From the graphical representation, it is evident that to estimate CFO to an accuracy of 3 kHz averaged over 1000 different noise and reference symbol sequences, when signal-to-noise-ratio (SNR) is varied from −24 dB to −12 dB in steps of 2 dB, the conventional method of FIG. 2 takes approximately 6 radio frames, the conventional method of FIG. 3 takes approximately 13 to 14 radio frames. Whereas the proposed method of FIGS. 4 through 6C takes between 6 to 8 radio frames. It is further evident from the graphical representation that number of radio-frames needed, in average, by the proposed method of FIGS. 4 through 6C is close to the conventional method of FIG. 2 even at low SNR's and yet has very less computation complexity than the conventional method of FIG. 2. It is further evident from the graphical representation that when the proposed method of FIGS. 4 through 6C is compared to the conventional method of FIG. 3, the proposed method of FIGS. 4 through 6C takes very less number of radio-frames and has complexity far lesser than to the conventional method of FIG. 2.

FIG. 9, with reference to FIGS. 4 through 8, is a table view illustrating a comparison of computation complexity between the conventional methods of FIGS. 2-3, and the proposed method of the FIGS. 4-6C according to an embodiment herein. Let 'N' be the length of a radio-frame and 'K' be length of a DFT sequence. Correlating 'm' sub-sequences involves N complex multiplications and N-m complex additions. K-point FFT (or DFT) is computed by radix-2 algorithm involves K log$_2$(K) complex additions and K/2 log$_2$(K) complex multiplications, and the level of computational complexity is depicted between the conventional methods of FIG. 2, FIG. 3, and the proposed method of the FIGS. 4-6C in FIG. 9.

FIGS. 10A-10C, through FIGS. 4-9, is a flow diagram illustrating a method of generating a hypothesis and estimating a carrier frequency offset in the receiver 400 based on the hypothesis according to an embodiment herein. In step 1002, a signal that includes a first received radio frame and a second received radio frame is received in the receiver 400 from a transmitter. Each of the first received radio frame and the second received frame includes a received sequence of length N. In step 1004, the first received radio frame is divided into a first received sub-sequence and a second received sub-sequence (e.g., using the processor 402). The first received sub-sequence and the second received sub-sequence of the first received radio frame are of equal length, in the preferred embodiment. In step 1006, a first radio reference frame stored in the memory 404 of the receiver 400 is divided into a first referenced sub-sequence and a second referenced sub-sequence (e.g., using the processor 402). The first reference sub-sequence and the second reference sub-sequence of the first radio reference frame are of equal length. In step 1008, (i) the first received sub-sequence of the first received radio frame are correlated with the first referenced sub-sequence of the first reference radio frame (e.g., using the correlation unit 406 of FIG. 4), and (ii) the second received sub-sequence of the first received radio frame with the second referenced sub-sequence of the first reference radio frame (e.g., using the correlation unit 406 of FIG. 4) to obtain a first correlation value and a second correlation value for the first received radio frame.

In step 1010, (i) a first value of hypothesis for the first received radio frame is generated (e.g., using the hypothesis generation unit 408) by multiplying a complex conjugate of the first correlation value of the first received radio frame with the first correlation value of the first received radio frame, and (ii) a second value of hypothesis is generated (e.g., using the hypothesis generation unit 408) by multiplying the complex conjugate of the first correlation value of the first received radio frame with the second correlation value of the first received radio frame. In step 1012, a first hypothesis is generated (e.g., using the hypothesis generation unit 408) based on the first value of hypothesis and the second value of hypothesis of the first received radio frame. In step 1014, the second received radio frame is divided into a first received sub-sequence and a second received sub-sequence (e.g., using the processor 402). The first received sub-sequence and the second received sub-sequence of the second received radio frame are of equal length.

In step 1016, a second radio reference frame stored in the memory 404 of the receiver 400 is divided into a first referenced sub-sequence and a second referenced sub-sequence (e.g., using the processor 402). The first reference sub-sequence and the second reference sub-sequence of the second radio reference frame are of equal length. In step 1018, (i) the first received sub-sequence of the second received radio frame is correlated with the first referenced sub-sequence of the second referenced radio frame (e.g., using the correlation unit 406 of FIG. 4), and (ii) the second received sub-sequence of the second received radio frame with the second referenced sub-sequence of the second referenced radio frame (e.g., using the correlation unit 406 of FIG. 4) to obtain a first correlation value and a second correlation value for the second received radio frame.

In step 1020, (i) a first value of hypothesis for the second received radio frame is generated (e.g., using the hypothesis generation unit 408) by multiplying a complex conjugate of the first correlation value of the second received radio frame with the first correlation value of the second received radio frame, and (ii) a second value of hypothesis for the second received radio frame is generated (e.g., using the hypothesis generation unit 408) by multiplying a complex conjugate of the first correlation value of the second received radio frame with the second correlation value of the second received radio frame. In step 1022, a second hypothesis is generated (e.g., using the hypothesis generation unit 408) based on the first value of hypothesis and the second value of hypothesis of the second received radio frame. In step 1024, the first hypothesis and the second hypothesis are averaged (e.g., using the hypothesis generation unit 408) to obtain an averaged hypothesis for estimating the carrier frequency offset.

In step 1026, a discrete fourier transformation (DFT) is performed on the averaged hypothesis to obtain a DFT sequence (e.g., using the discrete fourier transformation unit 410 of FIG. 4). In step 1028, a peak position of the DFT sequence is determined (e.g., using the peak position determination unit 412 of FIG. 4). In step 1030, the carrier frequency offset is estimated (e.g., using the carrier frequency estimation unit 414 of FIG. 4) based on the peak position of the DFT sequence.

The above proposed method in the FIGS. 4-6C enables to perform averaging of two or more hypothesis in time domain, and the estimation of the CFO estimation in frequency domain, unlike the conventional methods of FIGS. 2 and 3, where averaging of hypothesis and CFO estimation both are performed in either time domain or frequency domain. The conventional method of FIG. 3 is a low complexity CFO estimation technique. Since the CFO estimation is performed in time domain in the conventional method of FIG. 3, the CFO estimate includes noise enhancement, and to counter the effects of noise-enhancement, the conventional method of FIG. 3 (ISDC method) needs relatively a large number of averages. The conventional method of FIG. 2 has higher computational complexity since FFT operation is performed for every radio frame. Thus, the computational complexity of the proposed method as depicted in the FIGS. 4 through 6C is lower than the conventional method of FIG. 2 as the FFT (or DFT) is computed only once in the proposed method as depicted in the FIGS. 4 through 6C which is evident from the FIG. 9. Further, the CFO estimated and the number of averages required, is lesser than that for the conventional method of FIG. 3 as the estimation of the CFO estimation in frequency domain in the proposed method as depicted in the FIGS. 4 through 6C.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of generating a hypothesis for estimating a carrier frequency offset in a receiver, the method comprising:
   receiving, from a transmitter, a signal comprising a first received radio frame, and a second received radio frame, wherein each of the first received radio frame and the second received frame comprises a received sequence of length N;
   dividing the first received radio frame into a first received sub-sequence, and a second received sub-sequence, wherein the first received sub-sequence and the second received sub-sequence of the first received radio frame are of equal length;
   dividing, a first radio reference frame stored in a memory of the receiver, into a first referenced sub-sequence, and a second referenced sub-sequence, wherein the first reference sub-sequence and the second reference sub-sequence of the first radio reference frame are of equal length;
   correlating (i) the first received sub-sequence of the first received radio frame with the first referenced sub-sequence of the first reference radio frame, and (ii) the second received sub-sequence of the first received radio frame with the second referenced sub-sequence of the first reference radio frame to obtain a first correlation value and a second correlation value for the first received radio frame;
   generating, (i) a first value of hypothesis for the first received radio frame by multiplying a complex conjugate of the first correlation value of the first received radio frame with the first correlation value of the first received radio frame, and (ii) a second value of hypothesis by multiplying the complex conjugate of the first correlation value of the first received radio frame with the second correlation value of the first received radio frame;
   generating a first hypothesis based on the first value of hypothesis and the second value of hypothesis of the first received radio frame;
   dividing the second received radio frame into a first received sub-sequence, and a second received sub-sequence, wherein the first received sub-sequence and the second received sub-sequence of the second received radio frame are of equal length;
   dividing, a second radio reference frame stored in a memory of the receiver, into a first referenced sub-sequence, and a second referenced sub-sequence, wherein the first reference sub-sequence and the second reference sub-sequence of the second radio reference frame are of equal length;
   correlating (i) the first received sub-sequence of the second received radio frame with the first referenced sub-sequence of the second referenced radio frame, and (ii) the second received sub-sequence of the second received radio frame with the second referenced sub-sequence of the second referenced radio frame to obtain a first correlation value and a second correlation value for the second received radio frame;
   generating (i) a first value of hypothesis for the second received radio frame by multiplying a complex conjugate of the first correlation value of the second received radio frame with the first correlation value of the second received radio frame, and (ii) a second value of hypothesis for the second received radio frame by multiplying a complex conjugate of the first correlation value of the second received radio frame with the second correlation value of the second received radio frame; and
   generating a second hypothesis based on the first value of hypothesis and the second value of hypothesis of the second received radio frame; and
   averaging the first hypothesis and the second hypothesis to obtain an averaged hypothesis for estimating the carrier frequency offset.

2. The method of claim 1, further comprising performing a discrete fourier transformation (DFT) on the averaged hypothesis to obtain a DFT sequence.

3. The method of claim 1, further comprising determining a peak position of the DFT sequence.

4. The method of claim 1, further comprising estimating the carrier frequency offset based on the peak position of the DFT sequence.

5. A method of generating a hypothesis for estimating a carrier frequency offset in a receiver, the method comprising:
   receiving, from a transmitter, a signal comprising a first received radio frame, and a second received radio frame, wherein each of the first received radio frame and the second received frame comprises a received sequence of length N, and wherein a received sequence in the first received radio frame and the second received radio frame is expressed in accordance with an equation:

$\{r_n(j): j=0, \ldots N-1 \& n=0, 1 \ldots\};$ dividing the first received radio frame into a first received sub-sequence, and a second received sub-sequence, wherein the first received sub-sequence and the second received sub-sequence of the first received radio frame are of equal length;
   dividing, a first radio reference frame stored in a memory of the receiver, into a first referenced sub-sequence, and a second referenced sub-sequence, wherein the first reference sub-sequence and the second reference sub-sequence of the first radio reference frame are of equal length;

correlating (i) the first received sub-sequence of the first received radio frame with the first referenced sub-sequence of the first reference radio frame, and (ii) the second received sub-sequence of the first received radio frame with the second referenced sub-sequence of the first reference radio frame to obtain a first correlation value and a second correlation value for the first received radio frame;

generating, (i) a first value of hypothesis for the first received radio frame by multiplying a complex conjugate of the first correlation value of the first received radio frame with the first correlation value of the first received radio frame, and (ii) a second value of hypothesis by multiplying the complex conjugate of the first correlation value of the first received radio frame with the second correlation value of the first received radio frame;

generating a first hypothesis based on the first value of hypothesis and the second value of hypothesis of the first received radio frame;

dividing the second received radio frame into a first received sub-sequence, and a second received sub-sequence, wherein the first received sub-sequence and the second received sub-sequence of the second received radio frame are of equal length;

dividing, a second radio reference frame stored in a memory of the receiver, into a first referenced sub-sequence, and a second referenced sub-sequence, wherein the first reference sub-sequence and the second reference sub-sequence of the second radio reference frame are of equal length, and wherein a reference sequence in the first radio reference frame and the second radio reference frame are expressed in accordance with an equation:

$$\{P(j): j=0, \ldots N-1\},$$

where P(j) represents reference sequence;

correlating (i) the first received sub-sequence of the second received radio frame with the first referenced sub-sequence of the second referenced radio frame, and (ii) the second received sub-sequence of the second received radio frame with the second referenced sub-sequence of the second referenced radio frame to obtain a first correlation value and a second correlation value for the second received radio frame, wherein the first correlation value, the second correlation value are obtained in accordance with an equation:

$$\{a_{n,i}, i=0, 1, 2 \ldots m-1\}, \text{ and}$$

$$\alpha_{n,i} = \sum_{j=0}^{\frac{N}{m}-1} P\left(t \times \frac{N}{m} + j\right) \times r_n\left(t \times \frac{N}{m} + j\right),$$

where n=0, 1, ... and i=0, 1, 2 ... m−1, where m is number of subsequence, and N/m represents length of a subsequence, and $a_{n,i}$ represents a correlation value for nth radio frame;

generating (i) a first value of hypothesis for the second received radio frame by multiplying a complex conjugate of the first correlation value of the second received radio frame with the first correlation value of the second received radio frame, and (ii) a second value of hypothesis for the second received radio frame by multiplying a complex conjugate of the first correlation value of the second received radio frame with the second correlation value of the second received radio frame, wherein the first hypothesis and the second hypothesis are expressed in accordance with an equation:

$$\{h(t)=h(t)+a_{n,0}^* \times a_{n,i}\},$$

where i=0, 1 ... m−1, and * is complex conjugation; and generating a second hypothesis based on the first value of hypothesis and the second value of hypothesis of the second received radio frame;

averaging the first hypothesis and the second hypothesis to obtain an averaged hypothesis $\{\{h(i)\}$ for estimating the carrier frequency offset;

performing a discrete fourier transformation (DFT) on the averaged hypothesis $\{\{h(i)\}$ to obtain a DFT sequence, wherein the DFT is performed in accordance with an equation:

$$H(k)=dft(\{h(i)\}), \text{ and}$$

$$H(k) = \sum_{j=0}^{m-1} h(f) \times e^{\frac{i s \pi f k}{K}},$$

where $i=\sqrt{-1}$, k=0, 1 ... K−1, where h(j) represents hypothesis, and H(k) represents the DFT sequence on the hypothesis, and $K=2^q$, for integer, $q \geq \log_2(m)$ determining a peak position 'ρ' of the DFT sequence, wherein the peak position 'ρ' is determined in accordance with an equation:

$$\rho = \text{argumax } H(k),$$

where k∈{0, 1 ... K−1}; and estimating the carrier frequency offset based on the peak position 'ρ' of the DFT sequence.

6. The method of claim 5, further comprising determining whether the peak position is greater than K/2 in accordance with an equation:

$$\rho > K/2.$$

7. The method of claim 6, wherein when ρ>K/2, the carrier frequency offset is estimated and expressed in accordance with an equation:

$$\Delta f_{est} = -(\{K-\rho\}/KT_s L).$$

8. The method of claim 7, wherein when ρ≤K/2, the carrier frequency offset is estimated and expressed in accordance with an equation:

$$\Delta f_{est} = +(\rho/KT_s L).$$

9. The method of claim 8, wherein $T_s$ represents sampling time duration, Δf represents a maximum CFO, and $\Delta f_{est}$ represents an estimated CFO.

10. A receiver to generate a hypothesis for estimating a carrier frequency offset in the receiver, wherein the receiver receives from a transmitter, a signal comprising a first received radio frame, and a second received radio frame, wherein each of the first received radio frame and the second received radio frame comprises a received sequence of length N, wherein the first received radio frame is divided into a first received sub-sequence, and a second received sub-sequence of equal length, and wherein the second received radio frame is divided into a first received sub-sequence and a second sub-sequence of equal length, the receiver comprising:
- a memory that stores a reference signal comprising a first radio reference frame, and a second radio reference frame, wherein the first radio reference frame is divided into a first referenced sub-sequence, and a second referenced sub-sequence, and wherein the second radio reference frame is divided into a first referenced sub-sequence, and a second referenced sub-sequence, wherein each of the first referenced sub-sequence, and the second referenced sub-sequence comprises of equal length;
- a correlation unit that
  - (a) correlates (i) the first received sub-sequence of the first received radio frame with the first referenced sub-sequence of the first referenced radio frame, (ii) the second received sub-sequence of the first received radio frame with the second referenced sub-sequence of the first referenced radio frame to obtain a first correlation value and a second correlation value for the first received radio frame, and
  - (b) correlates (i) the first received sub-sequence of the second received radio frame with the first referenced sub-sequence of the second referenced radio frame, (ii) the second received sub-sequence of the second received radio frame with the second referenced sub-sequence of the second referenced radio frame to obtain a first correlation value and a second correlation value for the second received radio frame; and
- a hypothesis generation unit that generates
  - (i) a first value of hypothesis for the first received radio frame by multiplying a complex conjugate of the first correlation value of the first received radio frame with the first correlation value of the first received radio frame,
  - (ii) a second value of hypothesis by multiplying the complex conjugate of the first correlation value of the first received radio frame with the second correlation value of the first received radio frame,
  - (iii) a first hypothesis based on the first value of hypothesis and the second value of hypothesis of the first received radio frame,
  - (iv) a first value of hypothesis for the second received radio frame by multiplying a complex conjugate of the first correlation value of the second received radio frame with the first correlation value of the second received radio frame,
  - (v) a second value of hypothesis for the second received radio frame by multiplying a complex conjugate of the first correlation value of the second received radio frame with the second correlation value of the second received radio frame,
  - (vi) a second hypothesis based on the first value of hypothesis and the second value of hypothesis of the second received radio frame, and
  - (vii) an averaged hypothesis for estimating the carrier frequency offset based on the first hypothesis and the second hypothesis.

11. The receiver of claim 10, further comprising a discrete fourier transformation unit that performs a DFT on the averaged hypothesis to obtain a DFT sequence.

12. The receiver of claim 11, further comprising a peak position determination unit that determines a peak position from the DFT sequence obtained based on the DFT performed on the averaged hypothesis.

13. The receiver of claim 12, further comprising a carrier frequency estimation unit that estimates a carrier frequency offset based on the peak position determined from the DFT sequence.

14. A receiver to generate a hypothesis for estimating a carrier frequency offset in the receiver, wherein the receiver receives from a transmitter, a signal comprising a first received radio frame, and a second received radio frame, wherein each of the first received radio frame and the second received frame comprises a received sequence of length N, wherein the first received radio frame is divided into a first received sub-sequence, and a second received sub-sequence of equal length, and wherein the second received radio frame is divided into a first received sub-sequence and a second sub-sequence of equal length, the receiver comprising:
- a memory that stores a reference signal comprising a first radio reference frame, and a second radio reference frame, wherein the first radio reference frame is divided into a first referenced sub-sequence, and a second referenced sub-sequence, and wherein the second radio reference frame is divided into a first referenced sub-sequence, and a second referenced sub-sequence, wherein each of the first referenced sub-sequence, and the second referenced sub-sequence comprises of equal length,
- wherein the received sequence in the first received radio frame and the second received radio frame is expressed in accordance with an equation:

$$\{r_n(j): j=0, \ldots N-1 \,\&\, n=0, 1 \ldots\}, \text{ and}$$

- wherein a reference sequence in the first radio reference frame and the second radio reference frame is expressed in accordance with an equation:

$$\{P(j): j=0, \ldots N-1\};$$

- a correlation unit that
  - (a) correlates (i) the first received sub-sequence of the first received radio frame with the first referenced sub-sequence of the first referenced radio frame, (ii) the second received sub-sequence of the first received radio frame with the second referenced sub-sequence of the first referenced radio frame to obtain (a) a first correlation value and a second correlation value for the first received radio frame, and
  - (b) correlates (i) the first received sub-sequence of the second received radio frame with the first referenced sub-sequence of the second referenced radio frame, (ii) the second received sub-sequence of the second received radio frame with the second referenced sub-sequence of the second referenced radio frame to obtain a first correlation value and a second correlation value for the second received radio frame,
- wherein the first correlation value, and the second correlation value for the first received radio frame and the second received radio frame, are obtained in accordance with an equation:

$$\{a_{n,i}: i=0, 1, 2 \ldots m-1\}, \text{ and}$$

$$a_{n,i} = \sum_{j=0}^{\frac{N}{m}-1} P\left(i \times \frac{N}{m} + j\right) \times r_n\left(i \times \frac{N}{m} + j\right),$$

where n=0, 1, ... and i=0, 1, 2 ... m−1, where m is number of subsequence, N/m represents length of a subsequence, and $a_{n,i}$ represents a correlation value for nth radio frame; and a hypothesis generation unit that generates
   (i) a first value of hypothesis for the first received radio frame by multiplying a complex conjugate of the first correlation value of the first received radio frame with the first correlation value of the first received radio frame,
   (ii) a second value of hypothesis by multiplying the complex conjugate of the first correlation value of the first received radio frame with the second correlation value of the first received radio frame,
   (iii) a first hypothesis based on the first value of hypothesis and the second value of hypothesis of the first received radio frame,
   (iv) a first value of hypothesis for the second received radio frame by multiplying a complex conjugate of the first correlation value of the second received radio frame with the first correlation value of the second received radio frame,
   (v) a second value of hypothesis for the second received radio frame by multiplying a complex conjugate of the first correlation value of the second received radio frame with the second correlation value of the second received radio frame,
   (vi) a second hypothesis based on the first value of hypothesis and the second value of hypothesis of the second received radio frame, and
   (vii) an averaged hypothesis for estimating the carrier frequency offset based on the first hypothesis and the second hypothesis, wherein the averaged hypothesis is expressed in accordance with an equation:

$$\{h(t)=h(t)+a_{n,0}{}^{*}\times a_{n,i}\},$$

where i=0, 1 ... m−1, * is complex conjugation, and {h(t)} is the averaged hypothesis;

a discrete fourier transformation unit that performs a discrete fourier transformation (DFT) on the averaged hypothesis {{h(i)} to obtain a DFT sequence, wherein the DFT is performed in accordance with an equation:

$$H(k)=dft(\{h(i)\}), \text{ and}$$

$$H(k) = \sum_{j=0}^{m-1} h(f) \times e^{\frac{i s \pi f k}{K}}$$

where $i=\sqrt{-1}$, $k=0, 1 \ldots K-1$, where h(j) represents hypothesis, H(k) represents the DFT sequence on the hypothesis, and $K=2^q$, for integer, $q \geq \log_2(m)$;

a peak position determination unit that determines a peak position from the DFT sequence obtained based on the DFT performed on the averaged hypothesis, wherein the peak position 'ρ' is determined in accordance with an equation:

$$\rho=\text{argumax } H(k), \text{ where } k \in \{0, 1 \ldots K-1\}; \text{ and}$$

a carrier frequency estimation unit that estimates a carrier frequency offset based on the peak position 'ρ' determined from the DFT sequence.

15. The receiver of claim 14, wherein the carrier frequency estimation unit determines whether the peak position 'ρ' is greater than K/2 in accordance with an equation:

$$\rho>K/2.$$

16. The receiver of claim 15, wherein when ρ>K/2, the carrier frequency offset is estimated and expressed in accordance with an equation:

$$\Delta f_{est}=-(\{K-\rho\}/KT_sL).$$

17. The receiver of claim 16, wherein when ρ≤K/2, the carrier frequency offset is estimated and expressed in accordance with an equation:

$$\Delta f_{est}=+(\rho/KT_sL).$$

18. The receiver of claim 17, wherein $T_s$ represents sampling time duration, $\Delta f$ represents a maximum CFO, $\Delta f_{est}$ represents an estimated CFO.

* * * * *